United States Patent
Canzanese, Jr. et al.

(10) Patent No.: US 9,853,997 B2
(45) Date of Patent: Dec. 26, 2017

(54) MULTI-CHANNEL CHANGE-POINT MALWARE DETECTION

(71) Applicant: Drexel University, Philadelphia, PA (US)

(72) Inventors: Raymond Joseph Canzanese, Jr., Philadelphia, PA (US); Spiros Mancoridis, Philadelphia, PA (US); Moshe Kam, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 338 days.

(21) Appl. No.: 14/686,420

(22) Filed: Apr. 14, 2015

(65) Prior Publication Data
US 2015/0295945 A1 Oct. 15, 2015

Related U.S. Application Data

(60) Provisional application No. 61/979,259, filed on Apr. 14, 2014.

(51) Int. Cl.
*G06F 11/00* (2006.01)
*G06F 12/14* (2006.01)
(Continued)

(52) U.S. Cl.
CPC ........ *H04L 63/145* (2013.01); *G06F 9/45545* (2013.01); *G06F 21/53* (2013.01);
(Continued)

(58) Field of Classification Search
CPC ........ G06F 21/50; G06F 21/55–21/554; G06F 21/56–21/568; G06F 21/577; H04L 63/14–63/145; H04L 63/20; H04L 63/205
See application file for complete search history.

(56) References Cited

U.S. PATENT DOCUMENTS

| | | | |
|---|---|---|---|
| 2007/0006313 A1* | 1/2007 | Porras | H04L 63/1441 726/24 |
| 2007/0239999 A1* | 10/2007 | Honig | G06F 21/554 713/194 |

(Continued)

OTHER PUBLICATIONS

Tartakovsky, et al., "Detection of intrusions in information systems by sequential change-point methods", Statistical Methodology, Jul. 2006, vol. 3(3), 252-293.*

(Continued)

*Primary Examiner* — Daniel Potratz
(74) *Attorney, Agent, or Firm* — Baker & Hostetler LLP

(57) ABSTRACT

A malware detection system and method detects changes in host behavior indicative of malware execution. The system uses linear discriminant analysis (LDA) for feature extraction, multi-channel change-point detection algorithms to infer malware execution, and a data fusion center (DFC) to combine local decisions into a host-wide diagnosis. The malware detection system includes sensors that monitor the status of a host computer being monitored for malware, a feature extractor that extracts data from the sensors corresponding to predetermined features, local detectors that perform malware detection on each stream of feature data from the feature extractor independently, and a data fusion center that uses the decisions from the local detectors to infer whether the host computer is infected by malware.

23 Claims, 11 Drawing Sheets

Malware Detection System Architecture

(51) Int. Cl.
G06F 12/16 (2006.01)
G08B 23/00 (2006.01)
H04L 29/06 (2006.01)
G06F 21/55 (2013.01)
G06F 9/455 (2006.01)
G06F 21/53 (2013.01)
G06F 21/56 (2013.01)
G06F 21/50 (2013.01)

(52) U.S. Cl.
CPC ............ G06F 21/55 (2013.01); G06F 21/566 (2013.01); H04L 63/1408 (2013.01); *G06F 21/50* (2013.01); *G06F 2009/45587* (2013.01)

(56) References Cited

U.S. PATENT DOCUMENTS

2011/0004935 A1* 1/2011 Moffie .................... G06F 21/53 726/23

2014/0230062 A1* 8/2014 Kumaran ............ H04L 63/1408 726/24

OTHER PUBLICATIONS

Chair, Z. et al, "Optimal Data Fusion in Multiple Sensor Detection Systems", IEEE Transactions on Aerospace and Electronic Systems, vol. AES-22, Issue: 1, Jan. 1986.*

Tartakovsky, "A Novel Approach to Detection of Intrusions in Computer Networks via Adaptive Sequential and Batch-Sequential Change-Point Detection Methods", IEEE Transactions on Signal Processing, Sep. 2006, 54(9), 3372-3382.

Tartakovsky, et al, "Detection of Intrusion in Information Systems by Sequential Change-Point Methods", Statistical Methodology, Jul. 2006, vol. 3(3), 252-293.

* cited by examiner

MULTI-CHANNEL CHANGE-POINT MALWARE DETECTION

CROSS REFERENCE TO RELATED APPLICATION

This application claims priority to U.S. Provisional Application No. 61/979,259 filed Apr. 14, 2014. The content of that patent application is hereby incorporated by reference.

GOVERNMENT RIGHTS

The subject matter disclosed herein was made with government support under award CNS-1228847 awarded by the National Science Foundation. The Government has certain rights in the herein disclosed subject matter.

TECHNICAL FIELD

The invention relates to malware detection systems and methods and, more particularly, to malware detection systems and methods employing a multi-channel change-point approach that may detect the time when a system changes from a clean to an infected state.

BACKGROUND

Malware-based cyber attacks are becoming more prevalent. The malware used in such attacks are increasing in sophistication and focusing on clandestine operation and evasion of traditional defenses. Meanwhile, computing infrastructure continues to grow in both size and complexity, illustrated by recent trends such as the movement toward cloud computing and the emergence of ultra-large-scale systems (ULS). The complex computing systems employed by governments, corporations, and other institutions are frequently targeted by cyber-attacks designed for espionage and sabotage. The malicious software (malware) used in such attacks are typically custom designed or obfuscated to avoid detection by traditional antivirus software. Traditional malware defenses mechanisms primarily work by preventing potential malware from passing through a network or executing on a host computer. Traditional malware defenses include antivirus software, which use static signature-based detection techniques to identify potential malware. Popular due to their low false-alarm rates and ease of use, antivirus software requires new malware samples to be discovered and analyzed before they can be detected, leaving hosts vulnerable to new malware during the time period between the sample first being used in a cyber-attack and the creation of detection signatures for that sample. The ULSs used by governments, corporations, and other institutions, are particularly vulnerable to new malware, since these systems are constantly subject to cyber-attacks and their size and complexity complicate detection.

Antivirus software also may be used to detect obfuscated variants of known malware. Obfuscations may be applied to malware using specialized software that reorders, encrypts, compresses, recompiles, or otherwise changes the code without altering its function. Obfuscations also may be applied automatically and incrementally, as is the case with metamorphic and polymorphic malware that mutate as they propagate. The popularity of obfuscating malware to evade detection may be increasing because the engineering effort required to design new malware exceeds the effort to obfuscate existing malware. Accordingly, some new antivirus detection signatures may not be created for new malware, but rather for obfuscated variants of known malware.

The traditional defense against malware-based attacks has been the use of signature-based anti-virus (AV) software. Such software have been demonstrated to be vulnerable to simple obfuscations, leading malware authors to become increasingly adept at obfuscating their malware and evading detection. Furthermore, as malware become more focused on clandestine operation, they become increasingly difficult to detect after they evade AV software.

Behavior-based malware detection has been widely studied, using a variety of models and methods. Early work in malware and intrusion detection used system call patterns to identify anomalous behavior. Extensions to this work include efforts to use the arguments of system calls as features, machine learning algorithms for detection, and high-level models of system activity to improve detection.

Additional proposed methods of behavioral malware detection include taint analysis, a technique specifically intended for privacy-breaching malware. Also used are model checking, machine learning using performance monitors, computational geometry-based anomaly detection, and semantics that describe malicious behaviors. In the related field of network intrusion detection systems (NIDS), sequential change-point detection techniques have been applied to data collected from networks to identify intrusions and to detect denial of service (DoS) attacks.

A recent paper by Canali et al. entitled "A quantitative study of accuracy in system call-based malware detection," in Proceedings of the 2012 International Symposium on Software Testing and Analysis, ser. ISSTA 2012. New York, N.Y., USA: ACM, 2012, pp. 122-132, studies the performance of various behavioral malware detection models, including n-gram, tuple, and bag of words models, on system calls and system behaviors. The two major contributions of Canali are that model selectivity and specificity do not necessarily improve detection performance, and that extensive empirical evaluation is required to establish the usefulness of behavioral malware detection techniques.

SUMMARY

The invention described herein supplements anti-virus software by providing a new defense against malware-based cyber-attacks, one that detects malware that evades anti-virus software. The focus of the invention is primarily on detecting the execution of new malware samples that are obfuscated variants of, or behaviorally similar to, known malware. To detect the execution of hitherto unseen malware samples, a malware detection system is provided that automatically characterizes normal operation of computer hosts and detects behavioral changes indicative of malware infection. The system is designed to be used on-line on production hosts, using behavioral features and detection algorithms selected to provide rapid malware detection while minimizing the occurrence of false alarms (FAs) and introducing minimal computational overhead. The key features of the invention include:

Feature Extraction: A feature extraction process is provided that is designed to provide operating system-level features that can be used to discriminate between clean and infected hosts. To minimize the occurrence of FAs, the features are transformed using linear discriminant analysis (LDA) to be unaffected by benign changes in host workload.

Detection: A multi-channel detection architecture is provided that uses sequential change-point detection algorithms to infer the execution of malware on a host, and a data fusion center (DFC) to combine the multiple simultaneous decisions into a system-wide diagnosis.

The systems and methods described herein may be used to detect the execution of malware on a live host computer. The types of malware that may be detected are types of malware that may evade traditional defenses, such as new and obfuscated malware variants, supplementing existing defenses and serving as an auxiliary safety net to detect if a host is infected. Systems and techniques described herein may quickly and accurately detect such otherwise difficult-to detect malware. The problem of malware detection is presented as a multi-channel change-point detection problem, wherein a goal is to identify the point in time when a system changes from a known clean state to an infected state. A host based malware detection system is described herein that is designed to run at the hypervisor level, monitoring hypervisor and guest operating system sensors and sequentially determining whether the host is infected. A case study is described wherein the detection system is used to detect various types of malware on an active web server under heavy computational load.

In an example embodiment, a novel multi-channel change-point malware detection system may detect the time t, when a system changes from a clean to infected state, under the assumption that at time t, a subset of the features will change distribution from $p\theta_{m;0}(xm)$ to $p\theta_{m;1}(xm)$, where $\theta_{m;0}$ and $\theta_{m;1}$ are uniquely determined parameters for each feature distribution. It is assumed that $\theta_{m;0}$ can be learned from a limited set of clean training data and that $\theta_{m;1}$ is unknown.

Exemplary embodiments of the malware detection system and method of the invention provides the above-mentioned and other advantages and includes elements for implementing the methods of the invention, including sensors that monitor the status of a host computer being monitored for malware including malware that do not propagate through a network, a feature extractor that extracts feature data from the sensors corresponding to predetermined features, local detectors that perform malware detection on each stream of feature data from the feature extractor independently, and a data fusion center that uses the decisions from the local detectors to infer whether the host computer is infected by malware. In the exemplary embodiments, each sensor monitors a distinct operating phenomenon of the host computer and reports its raw data once per sampling period, and the sensor data are processed by the feature extractor to transform raw sensor data into a set of features to use for detection of malware.

In the exemplary embodiments, the feature extractor selects the predetermined features by performing a two-sample Kolmogorov-Smirnov test on the feature data to determine for each extracted feature and each malware sample whether the feature exhibits a change in distribution after the host computer is infected and, prior to using the CUSUM test, eliminates those features whose data are not informative for malware detection using the CUSUM test. Such predetermined features may include at least one of processor hypercalls/second, interrupt hypercalls/second, large page translation lookaside buffer fills/second, percent privileged time, MSR accesses cost, CPUID instructions cost, outbound connections/second, miniport send cycles/second, stack retrieve indication cycles/second, and NDIS receive indication cycles/second. In the exemplary embodiments, the feature extractor transforms the predetermined features through feature scaling, in which normalization is used for the performance monitor data and a term frequency-inverse document frequency (TF-IDF) transformer for feature data samples, a feature reduction step in which principal component analysis (PCA) is used to remove redundancy in the feature data samples, and a second feature reduction step in which linear discriminant analysis (LDA) may be used to project the feature data samples onto a low-dimensional space that optimally separates the clean and infected datasets. The TF-IDF transformer scales the feature data samples and deemphasizes the most commonly called system functions, computes products of term frequency tf and inverse document frequency idf, and scales the term frequency proportionally to a number of calls to a system function per second.

In the exemplary embodiments, each local detector sequentially monitors a single stream of feature data from the feature extractor and detects whether a change has occurred in a distribution of the feature data. The local detectors also provide a new decision every sampling period regarding whether a change has occurred in the distribution of the feature data. The local sequential detectors also may each perform an implementation of a change-point detection technique comprising a Page's cumulative sum (CUSUM) test that, in an exemplary embodiment, is implemented as a repeated cumulative log-likelihood ratio test with an adaptive detection threshold.

In the exemplary embodiments, the data fusion center receives decisions from the local detectors regarding the existence of malware in the feature data each sampling period and combines the decisions from the local detectors into a single malware diagnosis for the host computer. The data fusion center may employ a k out of N fusion rule, where k is a threshold of a number of positive detections and N is a total number of decisions reported by the local detectors, where N=2M and M is the number of local detectors. The data fusion center also may track times at which decisions are made by the local detectors.

The invention also includes methods for detecting malware using these and other components as described herein and set forth in the claims below. These and other features of the systems and methods of the invention will be apparent to those skilled in the art from the following detailed description of the invention.

BRIEF DESCRIPTION OF THE DRAWINGS

Exemplary embodiments of the invention will be described in conjunction with the associated figures, of which.

DETAILED DESCRIPTION OF ILLUSTRATIVE EMBODIMENTS

Figure 1:
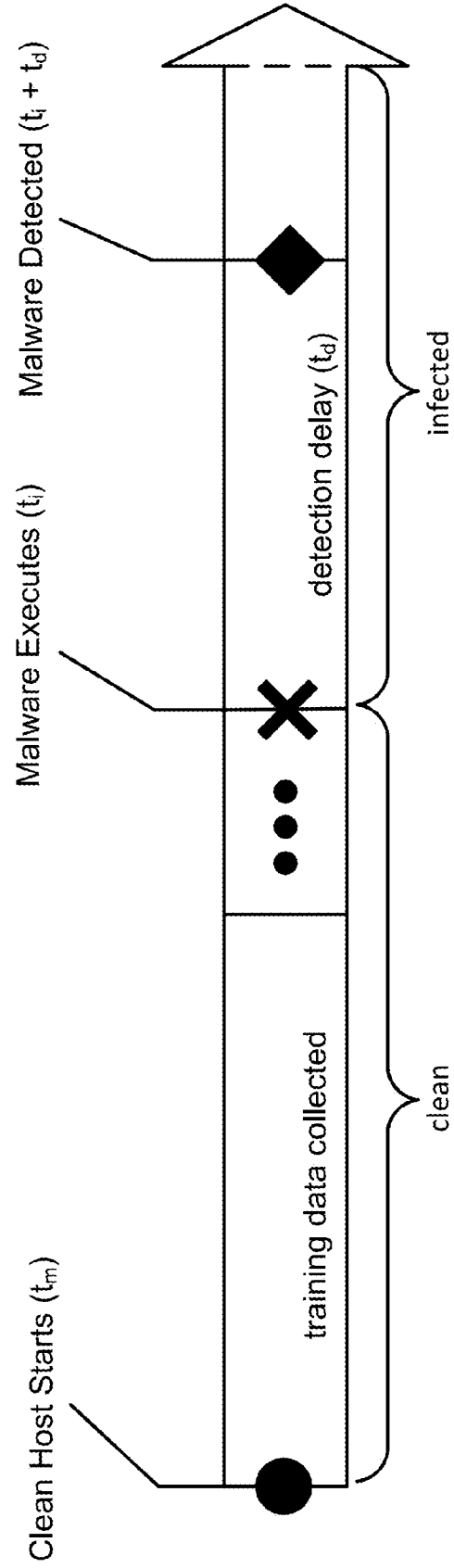
FIG. 1 illustrates an example timeline for malware detection, where at time $t_i$ the malware executes and the feature data form a new sequence of independent random variables $x_m = \{x_{m,t_i}, x_{m,t_i+1}, x_{m,t_i+2}, \ldots\}$ distributed according to a probability density $p\Theta_{m,1}(x_m)$ and $\Theta_{m,1} \neq \Theta_{m,0}$.

Certain specific details are set forth in the following description with respect to FIGS. 1-14 to provide a thorough understanding of various embodiments of the invention. Certain well-known details are not set forth in the following disclosure, however, to avoid unnecessarily obscuring the various embodiments of the invention. Those of ordinary skill in the relevant art will understand that they can practice other embodiments of the invention without one or more of the details described below. Also, while various methods are described with reference to steps and sequences in the following disclosure, the description is intended to provide a clear implementation of embodiments of the invention, and the steps and sequences of steps should not be taken as required to practice the invention.

The invention is generally directed to a malware detection system that can automatically characterize normal behavior of computer hosts and subsequently detect changes from normal behavior that are indicative of malware infection. The malware detection problem is framed herein as a change-point detection, or quickest detection, problem, wherein the goal is to detect the change from clean to infected as quickly as possible, subject to false alarm and missed detection (MD) constraints. The system is intended to be deployed on-line for the detection of malware on production hosts, and is therefore designed to have low memory and computational overhead. In addition, the malware detection system described herein detects malware that does not necessarily propagate over a network, such as backdoors, password stealers, Trojans, viruses, worms, and virtools, unlike prior art change-point detection methods of the type disclosed by Tartakovsky et al. in "A novel approach to detection of intrusions in computer networks via adaptive sequential and batch-sequential change-point detection methods," *IEEE Transactions on Signal Processing*, 54(9):3372-3382, September 2006., and in "Detection of intrusions in information systems by sequential change-point methods," *Statistical Methodology*, 3(3):252-293, 2006, which are directed to denial-of-service (DoS) and other types of network intrusions.

It is assumed herein that the characterization of normal behavior can be performed either automatically on-line, by assuming a host is clean during its early stages of execution under real-world workloads; or off-line, using test loads representative of real world use. For the results presented herein, the former approach is used, assuming hosts are initially clean and characterizing their normal behavior on-line.

In the following description, the following acronyms will have the indicated meaning:
AUC area under curve
AV anti-virus
CUSUM cumulative sum
DFC data fusion center
FA false alarm
LDA linear discriminant analysis
LLR log-likelihood ratio
NIDS network intrusion detection systems
PCA principal component analysis
ROC receiver operating characteristic
TF-IDF term frequency—inverse document frequency
TP true positive In the following description, the following notation will be used:
[•] A row vector
{•} A time series
$x_{pm}$ Raw data from m1 performance monitor sensors
$x_{sc}$ Raw data from m2 system call sensors
y Vector of n features
$v_\mu$ Vector of means used for normalization
$v_{fs}$ Vector of feature scaling weights
$\|•\|_2$ $L^2$ norm
$S_i$ Number of samples from the ith sensor
$s_i$ Number of nonzero samples from the ith sensor
$M_{lda}$ Matrix of weights used for LDA
$M_{pca}$ Matrix of weights used for PCA
θ Hadamard (element-wise) product
$Y^j$ Time series of feature data for the jth feature
$y_i^j$ Feature sample for the jth feature at time i
$p_{\mu,o}(\cdot)$ Normal PDF with mean and variance a
$d_i$ Vector of decisions output at time i
$d_i^j$ Decision output by the jth detector at time i Malware detection systems and techniques are described herein that are designed to detect obfuscated variants of known malware and previously unseen malware that are behaviorally similar to known malware. The malware detection system may monitor data from a suite of sensors installed on a host server at both the operating system and hypervisor levels, and may process the sensor data sequentially as they become available, using the data to infer whether the host is executing malware. The malware detection problem is posed as a change-point detection problem, wherein a goal is to detect whether a host is infected with malware by detecting changes in distribution of the sensor data as quickly as possible. In an example embodiment, it is assumed that the host being monitored is initially clean and free of malware and that during this period of time a baseline of normal operation for the host may be established. Assuming that the host may become infected with malware at any time, a goal is to determine whether the host is infected so that appropriate mitigating actions can be performed to limit data loss, data theft, further propagation of the malware, and disruption of services. As described herein, the malware detection problem is treated as a multi-channel, decentralized detection problem. The problem is characterized as multi-channel because each sensor measures a unique phenomenon and reports data that are governed by a distinct probability distribution. The problem is characterized as decentralized because detection is performed at the sensor level, wherein each local detector uses data from only one sensor to infer whether the host is infected. The global decision is made by a data fusion center (DFC), which sequentially processes the decisions from the local detectors to infer whether the host is infected. A case study is presented using the described malware detection system on a virtual machine host running a web server under heavy computational load. During testing, the host was originally clean and become infected with malware at a randomly selected time instance. Two hundred different malware samples were used for the study. The effectiveness of the detection system was examined both in terms of its overall detection accuracy and its average time to detection.

Detection of clandestine malware designed for espionage and sabotage that do not present obvious signs of infection is described herein. Clandestine malware may be designed to be difficult to detect, analyze, and remove. Such malware may use a variety of tricks to avoid detection and removal, including running as background processes, system services, or device drivers; disguising themselves as legitimate software; and altering the host OS's security configuration. Furthermore, malware often may be protected against various types of reverse engineering, including interactive debugging and disassembly. In order to perform the malicious tasks for which they are designed, malware may interact with the host OS. Furthermore, the tricks used by the malware to thwart detection, analysis, and removal also may require OS interaction. It is assumed that such OS interaction may cause perturbations in a set of observable features, and by monitoring these features it can be inferred whether a host is executing malware. The focus herein is on features measured by software sensors at the guest OS level and the hypervisor level.

Malware infection is posed in the following way: It is assumed that when a host is initially configured, it is clean, i.e., there is no malware executing on the host. Furthermore, it is assumed that the host may be monitored when it is initially configured to establish a baseline model of the clean host. Due to security vulnerabilities, intrusions, etc., the host may become infected with malware at any time after the initial model is established. A host is considered to be infected if there is malware actively executing on the host. The infection time $t_i$ is defined as the time at which the malware begins execution. A goal is to detect that the host is infected as close to time $t_i$ as possible so mitigating action can be taken to prevent data theft, data loss, system down time, further propagation of the malware, and other undesirable effects. The detection delay $t_d$ is the time that elapses between the infection time and the time malware is detected. It is assumed that $t_i$ is not guaranteed to be finite and that the distribution of $t_i$ is not known a priori, i.e., it is not know if or when a particular host might become infected with malware. Furthermore, it is not known a priori how likely it is that a particular host might become infected with malware. For a clean system, the feature data for each sensor are considered to be a sequence of independent random variables, where the data for the $m^{th}$ feature are given by $x_m = \{x_{m,1}, x_{m,2}, \ldots X_m.t_{i-1}\}$ distributed according to a probability density $p\theta_{m;0}(x_m)$, where to $\theta_{m,0}$ is a vector of the parameters of the distribution.

FIG. 1 depicts an example timeline for malware detection, where at time $t_i$ the malware executes and the feature data form a new sequence of independent random variables $x_m = \{x_{m,t_i}, x_{m,t_i+1}, x_{m,t_i+2}, \ldots\}$ distributed according to a probability density $p\Theta_{m,1}(x_m)$ and $\Theta_{m,1} \neq \Theta_{m,0}$. A goal is to determine if and when the distribution of the feature data changes from $p\Theta_{m,0}(x_m)$ to $p\Theta_{m,1}(x_m)$ for each sensor, where $\Theta_{m,0}$ and $\Theta_{m,1}$ are uniquely determined for each sensor. This type of detection problem, detecting a sudden change in distribution, may be referred to as quickest detection, change detection, or change-point.

It is assumed that at infection time $t_i$, a subset of the M total features may experience a change in distribution, and by monitoring which subset of sensors experience a change in distribution, the presence of malware on a host may be inferred. The subset of features that change distribution may not necessarily be the same for all malware samples but rather may be determined by the function and design of the malware.

To summarize, a goal is to detect the time $t_i$ when a system changes from a clean to infected state, under the assumption that at time $t_i$ a subset of the features will change distribution from $p\Theta_{m,0}(x_m)$ to $p\Theta_{m,1}(x_m)$, where $\Theta_{m,0}$ and $\Theta_{m,1}$ are uniquely determined parameters for each feature distribution. It is assumed that $\Theta_{m,0}$ may be learned from a limited set of clean training data and that $\Theta_{m,1}$ is unknown.

Detection System Design

Figure 2:
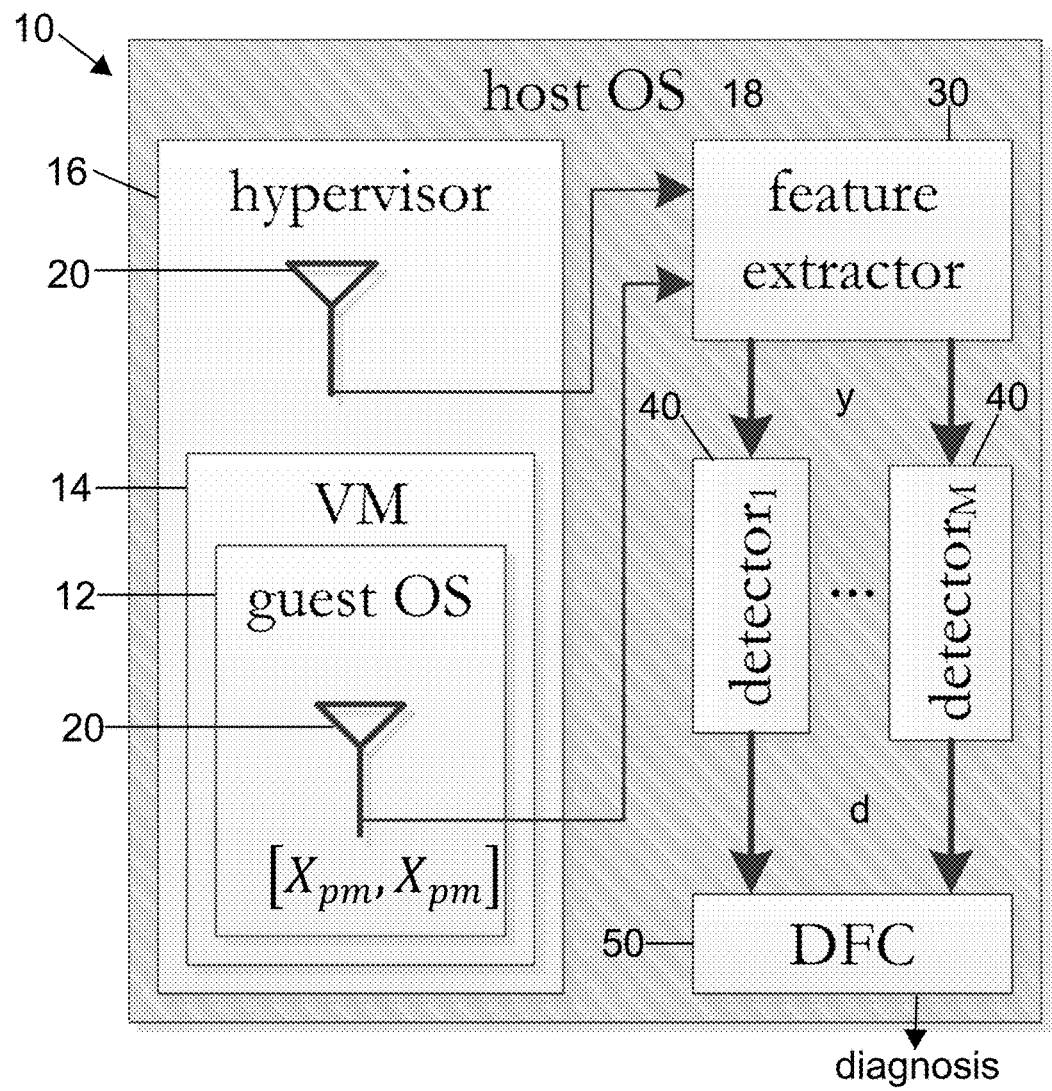
FIG. 2 illustrates an example architecture for a malware detection system designed to detect whether the guest OS running inside a virtual machine (VM) is infected with malware and which includes sensors that monitor the host at the hypervisor and guest OS levels, a feature extractor that extracts feature data from the sensors, local detectors that perform detection on each stream of feature data independently, and a data fusion center (DFC) that may use the decisions from the local detectors to infer whether the guest OS is infected.

FIG. 2 depicts an example architecture for a malware detection system 10. The malware detection system (MDS) 10 may be designed to detect whether the guest OS 12 running inside a virtual machine (VM) 14 is infected with malware. In this configuration, it is assumed that the VM 14 is managed by a hypervisor or a virtual machine monitor (VMM) 16. As shown in FIG. 2, the architecture of the MDS 10, may include four components:

1) The sensors 20 that may monitor the host at the hypervisor 16 and guest OS 12 levels;
2) The feature extractor 30 that may extract feature data from the sensors 20;
3) The local detectors 40 that may perform detection on each stream of feature data independently; and
4) The data fusion center (DFC) 50 that may use the decisions from the local detectors 40 to infer whether the guest OS 12 is infected.

In FIG. 2, each sensor 20 monitors a distinct host phenomenon and reports its raw data once per sampling period. All the sensor data are processed by the feature extractor 30, which transforms the raw sensor data into a set of features to use for detection. The local detectors 40 each sequentially monitors a single stream of feature data and detects whether a change has occurred in the distribution of the feature data. The local detectors 40 provide a new decision every sampling period. Each detector acts independently of the others, assuming a distinct probability distribution for each feature. Thus, the detection architecture is both distributed and multi-channel. The DFC 50 receives the decisions from the local detectors 40 at each sampling period, and combines the local decisions into a single diagnosis for the system. Thus, The DFC 50 determines at each sampling period whether the system is either clean or infected.

Sensors and Feature Extractor

The MDS 10 may be designed to work with any set of numeric features collected from applications, the guest OS 12, the hypervisor 16, or the host OS 18. In an example configuration, the features used by the MDS 10 may comprise data extracted from sensors 20 in both the guest OS 12 and the hypervisor 16. The features may fall roughly into the following categories:

Memory usage,
Processor usage,
Disk usage,
Page file usage,
Hardware usage, and
Network usage.

To mitigate the risk of malware running on the guest OS 12 tampering with the MDS 10, the hypervisor sensors 20, feature extractor 30, local detectors 40, and DFC 50 may be located outside the guest OS 12, as shown in FIG. 2. The guest OS sensors 20 may be built-in to the kernel of the guest OS 12, making them more robust than, for example, sensors running as a user-level process or sensors hooking the System Service Dispatch Table (SSDT) that can be easily modified. Furthermore, the layered approach of using sensors 20 at both the guest OS 12 and hypervisor 16 may reduce the likelihood that compromised sensors at a particular layer would result in missed detections.

Local Sequential Detectors

The feature extractor 30 may send streams of feature data to a series of local detectors 40, each of which independently may infer whether the guest OS 12 is infected based only on a single feature. This detection architecture may be advantageous because the subset of features exhibiting a change in distribution when malware are executed may differ for each malware sample, likely due to the differing function and implementation of the malware. As the malware detection problem is posed as a change-point detection problem, the local sequential detectors each may perform an implementation of a change-point detection technique. In an example embodiment, the implemented change-point detection technique may comprise a Page's cumulative sum (CUSUM) test. The CUSUM may be implemented as a repeated cumulative log-likelihood ratio test with an adaptive detection threshold. The CUSUM algorithm was formulated as a method to detect a change in a scalar parameter of a distribution from a known value $\theta_0$ to another known value $\theta_1$. Thus, it is assumed that the feature data may be approximately described by a known parametric distribution both before and after the change. However, it is not assumed that the value of the parameter is known after the change. Rather, it is assumed that the change will have a magnitude of at least $\delta$, i.e.:

$$|\theta_1 - \theta_0| \geq \delta. \tag{1}$$

Thus, a double-sided implementation of Page's CUSUM algorithm may be used to detect whether each of the parameters of the distribution exhibits either an increase or decrease of magnitude $\delta$, uniquely determining $\delta$ for each parameter.

While the CUSUM algorithm may be used on any parametric distribution, it was observed during testing that for the majority of the features, the data may be approximately described using a normal distribution. Thus, the CUSUM test performed at each local detector is defined herein as the detection of a change in either the mean or the variance of the feature data. Accordingly, there are four possible changes at each sensor 20. Either:

1) The mean increases from $\mu_0$ to $\mu_0 + \delta_\mu$,
2) The mean decreases from $\mu_0$ to $\mu_0 - \delta_\mu$,
3) The variance increases from $\sigma^2$ to $\sigma^2 + \delta_\sigma 2$, or
4) The variance decreases from $\sigma^2$ to $\sigma^2 - \delta_\sigma 2$.

To begin, the normal probability distribution function may be defined as:

$$p_{\mu,\sigma^2}(x) = \frac{1}{\sqrt{2\pi\sigma^2}} e^{-\frac{(x-\mu)^2}{2\sigma^2}}. \tag{2}$$

Next, the set of four cumulative log likelihood ratios (LLR) that are computed by each sensor 20 may be defined $g_n^{(1)}, g_n^{(2)}, g_n^{(3)}, g_n^{(4)}$, where the subscript indicates that it is the LLR at the $n^{th}$ data sample and the superscript indicates which of the four changes in the list above it is used to detect. The cumulative LLR may be defined recursively as:

$$g_n^{(1)} = g_{n-1}^{(1)} + \log\left(\frac{p_{\mu_0+\delta_\mu,\sigma_0^2}(x)}{p_{\mu_0,\sigma_0^2}(x)}\right) \tag{3}$$

$$g_n^{(2)} = g_{n-1}^{(2)} + \log\left(\frac{p_{\mu_0+\delta_\mu,\sigma_0^2}(x)}{p_{\mu_0,\sigma_0^2}(x)}\right)$$

$$g_n^{(3)} = g_{n-1}^{(3)} + \log\left(\frac{p_{\mu_0,\sigma_0^2+\delta_\sigma^2}(x)}{p_{\mu_0,\sigma_0^2}(x)}\right)$$

$$g_n^{(4)} = g_{n-1}^{(4)} + \log\left(\frac{p_{\mu_0,\sigma_0^2-\delta_\sigma^2}(x)}{p_{\mu_0,\sigma_0^2}(x)}\right)$$

Each cumulative LLR above will decrease if no change in parameter occurs and will increase if the corresponding change in parameter occurs. Since a goal is to detect only an increase in the LLR associated with a change in parameter, the LLR is reset to zero each time it becomes negative. This reset has the effect of transforming the standard log likelihood ratio test (LLRT), where the values in Equation 3 are compared to a fixed threshold, into an adaptive threshold test. The LLR in Equation 3 is modified as follows, where $a \in \{1, 2, 3, 4\}$:

$$g_n^{(a)} = \begin{cases} g_n^{(a)} & \text{if } g_n^{(a)} > 0 \\ 0 & \text{otherwise.} \end{cases} \tag{4}$$

Next, a modified LLRT may be performed on each of the four transformed LLR described by Equations 3 and 4 by comparing each ratio to a threshold $h^{(a)}$ in order to make a decision $d_n^{(a)}$:

$$d_n^{(a)} = \begin{cases} 1 & \text{if } g_n^{(a)} > h^{(a)} \\ 0 & \text{otherwise.} \end{cases} \tag{5}$$

Figure 3:
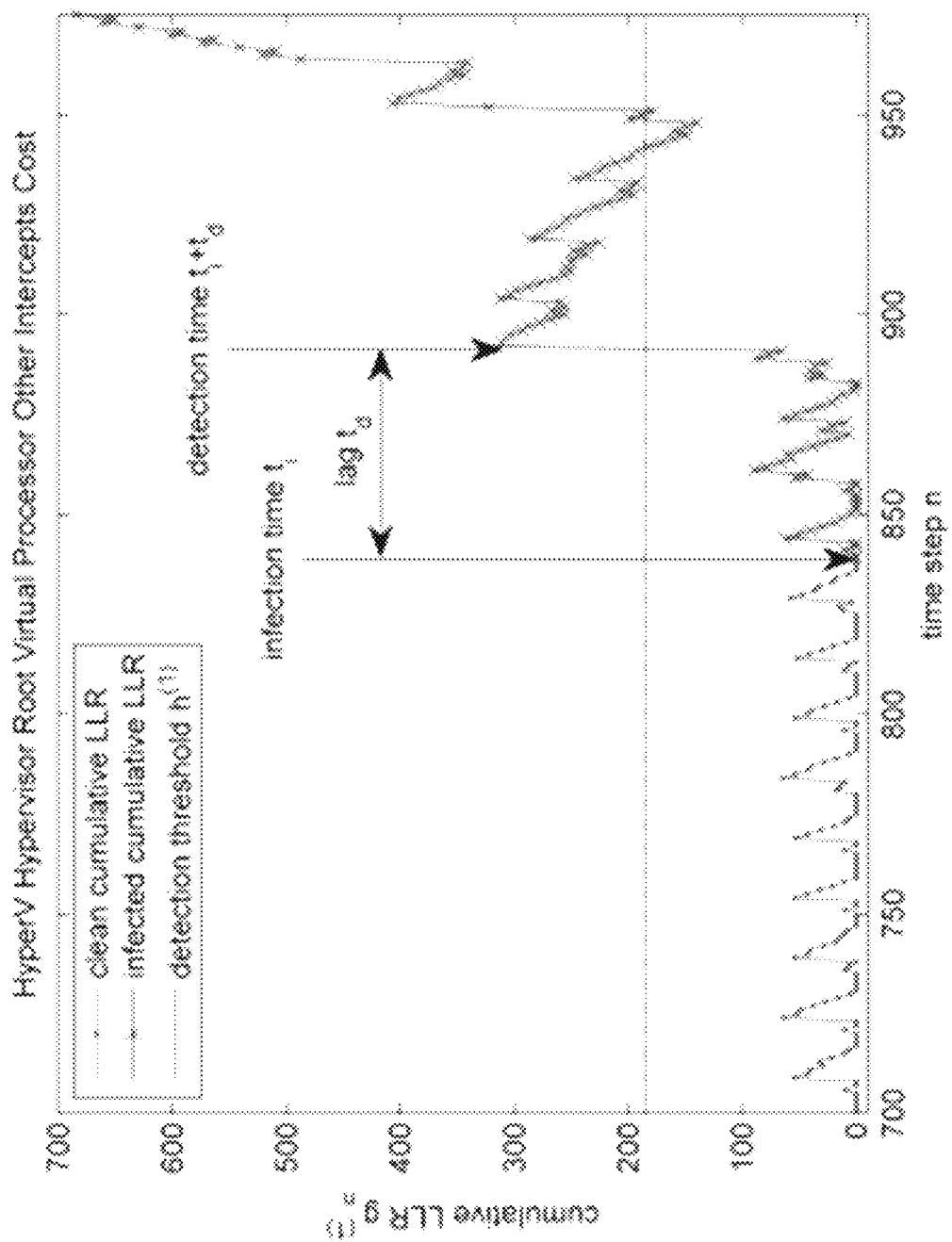
FIG. 3 illustrates Page's cumulative sum test being used to detect an increase in the mean of a particular feature, the virtual processor other intercepts cost, as reported by the hypervisor.

The effect of resetting the cumulative LLR and using a fixed threshold as shown in Equations 4 and 5 is that $g_n^{(a)}$ will remain near zero so long as a change in the distribution of the data has not occurred, and will increase after the corresponding change has occurred. FIG. 3 provides a visual depiction of Page's CUSUM test being used to detect an increase in the mean of a particular feature, the virtual processor other intercepts cost, as reported by the hypervisor 16. Before the malware infection occurs, the cumulative LLR values periodically spike above zero and are frequently reset to zero when the LLR becomes negative. At $t_i$=840 seconds, the malware is executed and the system is infected. After that time, an increase in the LLR $g_n^{(1)}$ is noted. Once it crosses the detection threshold $h^{(1)}$, the local detector 40 reports the decision that malware has been detected.

Each LLRT may result in a new decision $d_n^{(a)}$ after each new data point is considered. Whenever the decision is zero, indicating no malware has been detected, the test continues when the next data point arrives. Whenever the decision is one, indicating malware has been detected, the pair of tests for the parameter in which the change was detected stops since a decision has been reached, and the local detector 40 notifies the DFC 50 that malware has been detected. If a change is detected in both parameters, all four tests stop, and the local detector 40 notifies the DFC 50 that malware was detected in both parameters.

Once the tests have stopped, subsequent data may be discarded until the DFC 50 notifies the detector 20 that it should continue testing. The local detection process of computing four adaptive, cumulative LLR and comparing them to a threshold to make a decision may be performed independently for each of the M features. Because each sensor 20 measures a different phenomenon, the parameters of the distributions and detection thresholds may be uniquely determined for each feature.

The parameters $\mu_0$ and $\sigma^2$ may be determined during an initial training period, when the host is in a clean state and operating normally, as shown in the timeline in FIG. 1. During the training period, data may be collected and separated into blocks of equal length and the maximum likelihood estimates of the parameters may be computed. The standard deviations of the estimates may be used to determine the magnitudes $\delta_\mu$ and $\delta_\sigma 2$ of the changes to be detected. If the maximum likelihood estimate of the mean is given by $\mu_{ML}$ and has a standard deviation given by $\sigma_{ML}$, then a goal may be to detect a change of magnitude $\delta_\mu = n\sigma_{\mu ML}$, where n is a multiplier which indicates how many standard deviations of change to detect. $\delta_\sigma 2$ may be similarly determined using the maximum likelihood estimate of the sample variance and the standard deviation of the estimate.

Figure 4:
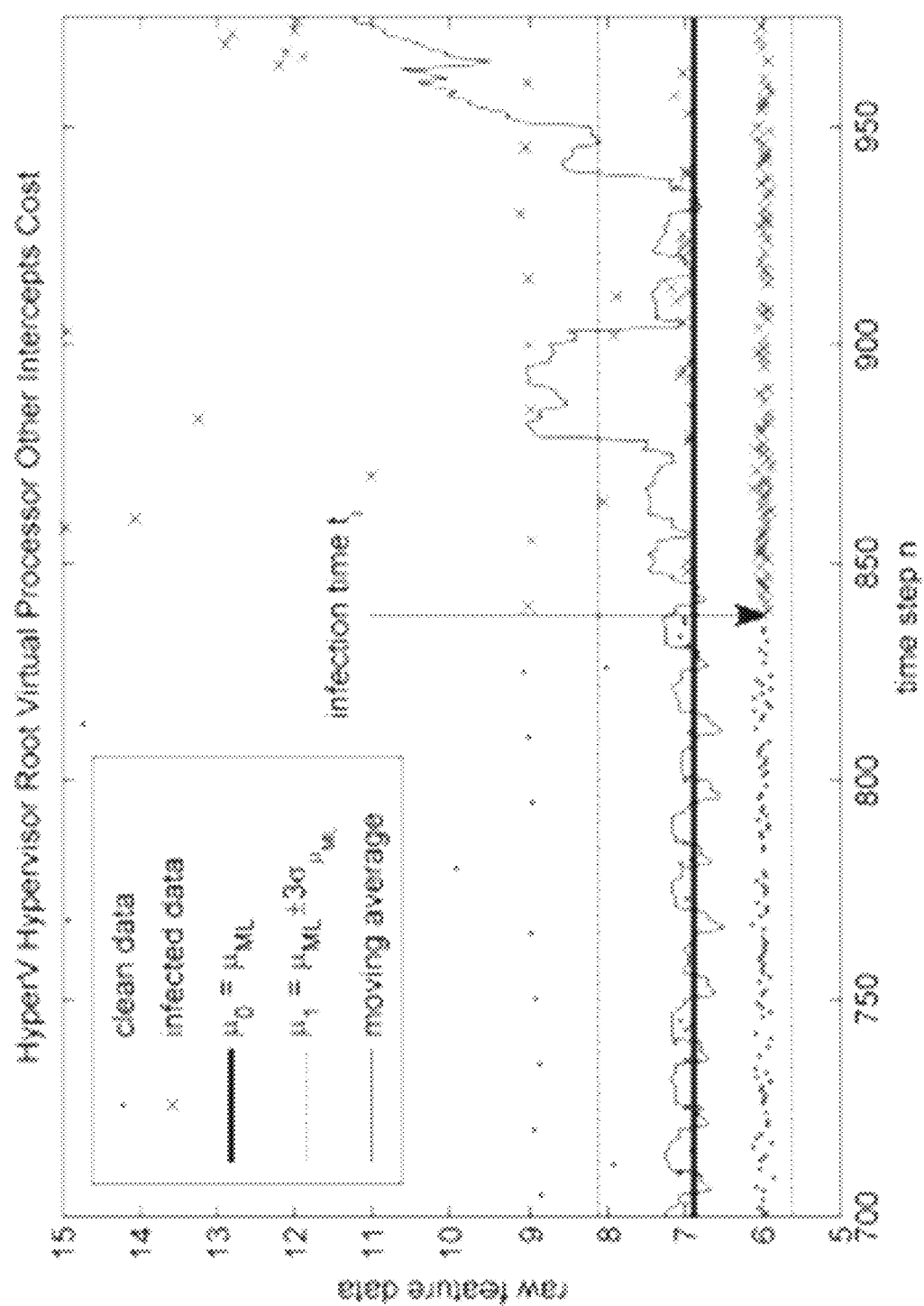
FIG. 4 illustrates an example depiction showing the virtual processor's other intercepts cost data used in FIG. 3, where the bold horizontal line indicates $\mu_{ML}$, the maximum likelihood estimate of $\mu_0$, the parallel lines indicate $\mu_0 \pm 3\sigma_{\mu ML}$, the parameters after the change used for computing the LLR $g_n^{(1)}$ and $g_n^{(2)}$, and a plot of the raw feature data and its moving average is provided.

For example, FIG. 4 is an example depiction showing the virtual processor's other intercepts cost data used in FIG. 3. The bold horizontal line indicates $\mu_{ML}$, the maximum likelihood estimate of $\mu_0$, and the parallel lines indicate $\mu_0 \pm 3\sigma_{\mu ML}$, the parameters after the change used for computing the LLR $g_n^{(1)}$ and $g_n^{(2)}$. FIG. 4 also shows a plot of the raw feature data and its moving average. Before $t_i$, the moving average closely matches $\sigma_{\mu ML}$, and after $t_i$, the moving average increases, resulting in the increase in $g_n^{(1)}$ and the positive detection indicated in FIG. 3.

The detection thresholds $h^{(k)}$ may be set to be a fixed number of standard deviations above the mean $g_n^{(a)}$ value observed during the training period. The appropriate number of standard deviations may be determined experimentally as described in context of the case study.

The selected approach described herein may be asymptotically efficient but sub-optimal, as the thresholds are selected in an ad hoc manner based on previously detected infections. The optimal selection of thresholds for decentralized quickest detection may require simultaneous solution of coupled algebraic equations.

Data Fusion Center

The data fusion center (DFC) 50 is responsible for making the global decision as to whether the host is infected. The DFC 50 may receive, at each iteration, reports from each local detector 40 indicating whether a change was detected in one or both of the parameters and uses a fusion rule to arrive at a global decision. The DFC 50 may employ a k out of N fusion rule, where k is the threshold of the number of positive detections and N is the total number of decisions reported by the local detectors 40. Because each local detector 40 detects changes in two different parameters, N is given as 2M where M is the number of local detectors 40. Thus, the DFC 50 may decide that the host is infected if at least k out of the N decisions reported by the local sensors 20 are positive.

One phenomenon observed during testing is that some sensors 20 report transient data spikes when running on a clean host. The magnitude of the spikes caused an increase in both the mean and the variance of the data, causing the corresponding local detectors 40 to report a positive detection. Over time, spikes from multiple sensors 20 yielded multiple false positive detections leading eventually to a global decision that the system was infected even though it was in fact clean, i.e., a global false positive. Testing indicated that these transient spikes in the sensor data were isolated events, happening at only one or two sensors at a time. This was a sharp contrast to the behavior exhibited when malware infection occurred, characterized by near-simultaneous changes in distribution at multiple sensors, leading to true positive detections from multiple local detectors 40 in quick succession.

To mitigate the occurrence of global false positives due to transient data spikes, the DFC 50 tracks not only the decisions made by each of the local sensors 20, but also the times at which the decisions are made. If the DFC 50 fails to make a global decision that the host is infected in a fixed time window after a local detector 40 indicates a positive detection, the DFC 50 notifies the local detector 40 to resume normal operation and reset its decision to zero. This modification to the k out of N decision rule used by the DFC 50 reduces the number of global false alarms reported by the DFC 50, especially during prolonged periods of clean operation of the host. The time window is determined experimentally as discussed in the description of the case study below.

Case Study

To assess the usefulness of the described malware detection system (MDS) 10 of the invention, a case study was performed using the MDS 10 to detect whether a host 18 under heavy computational load was infected with one of 200 different malware samples collected from the wild. The case study was performed on a custom-built malware detection testbed.

Malware may require a network connection to perform various tasks, such as "phoning home" to indicate that a new host has been infected, sending out spam email messages, sending stolen information to a remote host, attempting to propagate to other hosts, or communicating with other compromised hosts. Accordingly, a testbed was designed that would allow malware to establish connections to a remote host and have that remote host provide some limited interaction with the malware. The testbed comprised two physical machines: a server that became intermittently infected with malware and a network emulator.

The network emulator is the portion of the testbed designed to interact with malware that attempt to communicate over the network. The network emulator ran two major pieces of software: (1) a DNS server and (2) the Dionaea low interaction honeypot. The DNS server was used as the primary DNS server for the testbed and resolved all hostnames to the IP address of the honeypot. Furthermore, the network emulator also was configured as the default gateway for all traffic originating on the testbed, forwarding all traffic to the honeypot. The honeypot accepted incoming connections using many different protocols, including SMB, http, ftp, and MySQL, and interacts with the malware in order to gain copies of their malicious payloads. Thus, whenever malware attempted to communicate over the network, they were forwarded to the honeypot, which provides limited network interaction.

The server that became intermittently infected with malware ran Microsoft Windows Server 2012 and Microsoft's Hyper-V hypervisor-based server virtualization software. The virtual machines that are infected with malware run Microsoft Windows 7, Microsoft IIS Express Web Server, and Microsoft SQL Server, and are configured to host a default installation of the Drupal Content Management System.

In order to characterize how the MDS 10 would perform when deployed on a live system, the testbed was designed to automatically and repeatedly run all of the tests in the Drupal test suite in a random order determined each time the virtual machine was started. The Drupal test suite comprised 66 different categories of tests, each exercising different Drupal functions, such as file access, database access, image processing, PHP functions, content searches, system updates, content creation, and content access. All of the tests are used to ensure heterogeneity in the intensity of the load placed on the host and heterogeneity in the types of operations being performed. The test order is randomized to ensure the load during the training period varies and that the malware infection time t, does not always coincide with a particular test.

Another component of the testbed is the mechanism that infects the VM with malware. Each time the VM 14 was started, the MDS 10 automatically started, first training the local detectors 40 using the initial data retrieved from the sensors 20 and then performing detection. A separate daemon was used to randomly determine when the malware was executed on the VM 14. For the case study, the daemon executed the malware anywhere between 15 minutes and 2 hours after the VM 14 is started, to ensure that the malware executed independently of the underlying test load.

Figure 5:
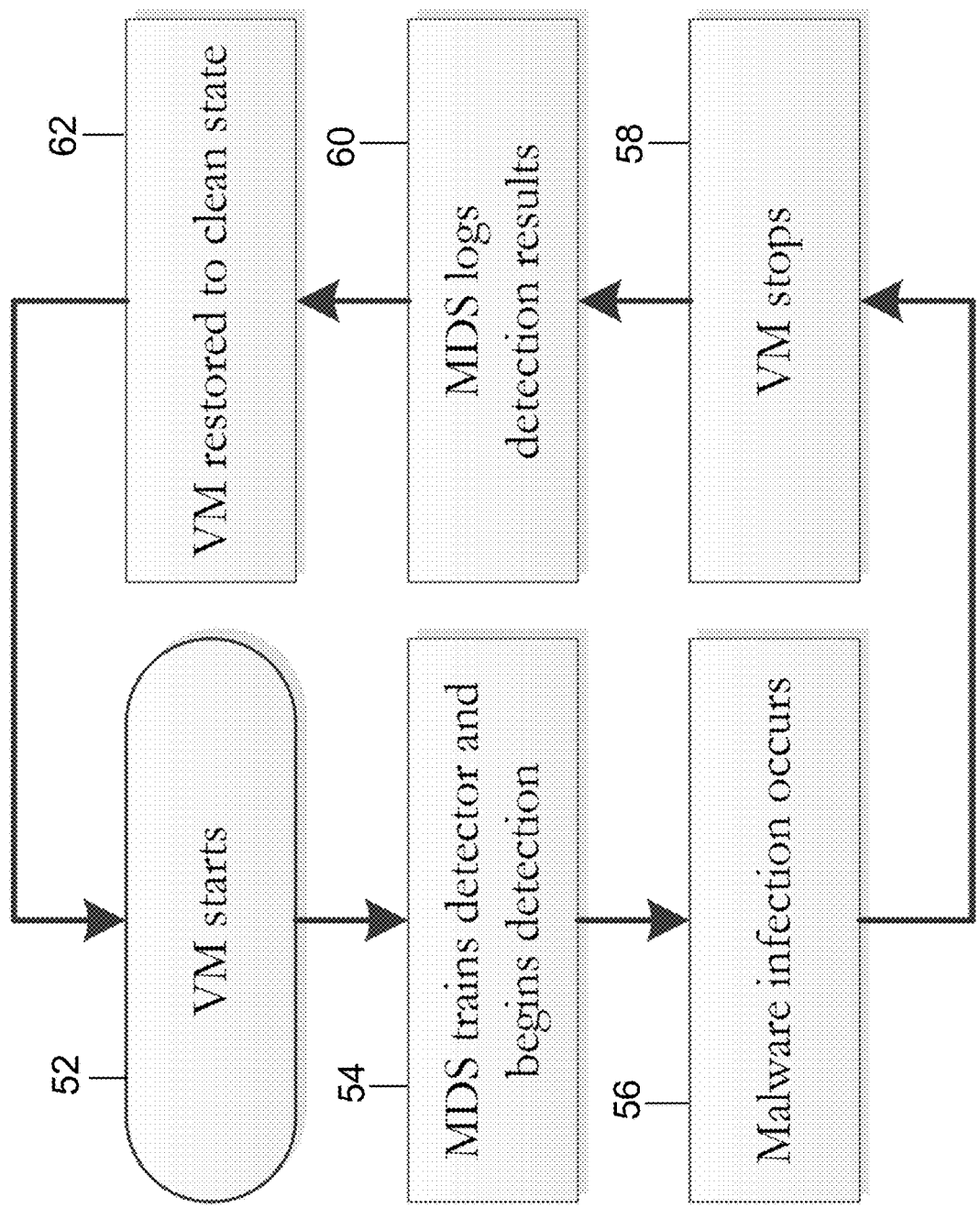
FIG. 5 illustrates an example flow chart summary of the testing process.

FIG. 5 depicts an example flow chart summary of the testing process. When the VM started at 52, the test load began immediately, and the MDS 10 trained the local detector a 40 and began detection at 54. The VM 14 executed in a clean state for a randomly determined period of time until when the malware executed and the system entered an infected state at 56. The VM 14 continued to run in an infected state for ten minutes, while the MDS 10 gathered data and performed detection. This ten-minute period was used for testing only. In an actual deployment, the MDS 10 would apply mitigation as soon as the malware are detected. Finally, the VM was stopped at 58, the MDS 10 saved all of the data it collected at 60, the VM 14 was restored to its clean state at 62, and the next test cycle began with another randomly chosen malware sample, permutation of the background load, and infection time $t_i$.

Malware

The malware used in the case study come from two different sources. First, a custom-built program is used to crawl blacklisted sites known to be hosting malware and download any samples it finds. Second, the Dionaea honeypot used in the network emulator is also used for its intended purpose as a honeypot, which interacts with infected hosts on the Internet to obtain malware samples. All of the malware are scanned and classified using the Virus-Total free online virus scanner, which scans the malware using a variety of different commercially available antivirus software. For the case study, 200 malware samples were selected at random from a malware collection. Of those malware samples, 16 were first seen between 2006 and 2011, and the remaining samples were first seen in 2012. Although there is no universal malware taxonomy, malware detection signatures may be used to approximately determine the classes of the selected malware. Using the Microsoft Malware Protection Center (MMPC) naming scheme, the malware may be assigned names into the categories listed in FIG. 6. The categories are defined as follows:

Backdoors are malware that provide clandestine remote access;

PWS are password stealers, malware that steal personal information;

Trojans are malware that are disguised as legitimate software;

Viruses are malware that replicate automatically;

Worms are malware that propagate automatically over a network; and

VirTools are tools such as rootkits that provide clandestine access to a host.

Figure 6:
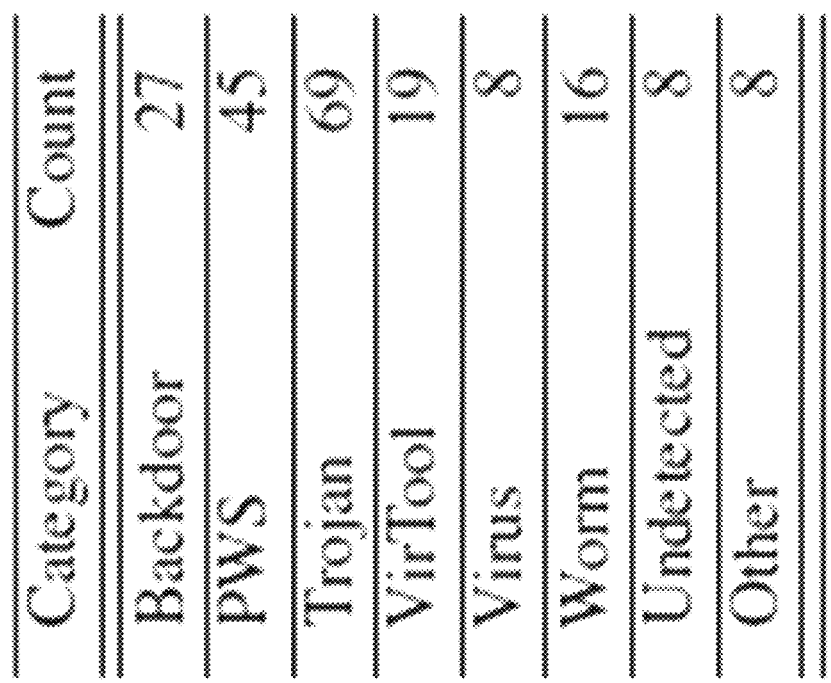
FIG. 6 illustrates sample malware classifications for assigning names into categories.

In addition to the above categories, two other categories are listed in FIG. 6. "Other" refers to malware that do not fall into any one of the above categories and "undetected" refers to malware that were not detected by any MMPC signatures. These eight undetected malware samples are indicative of the shortcoming of signature-based antivirus detection. Some virus detection signatures were not available up to seven months after their discovery.

Several of the more commonly known malware families are represented in the 200 malware samples used for testing, including Bifrose, Fynloski, Kelihos, ZBot, Swisyn, and Ramnit. The samples also include multiple variants within some of these malware families. Before they were used for testing, kernel traces and network logs were analyzed to verify that the malware performed some observable malicious task, such as attempting to propagate over the network, altering the host configuration, or installing additional software.

Feature Extraction

In an example configuration, 667 sensors 20 exported by the guest OS 12 and 989 sensors exported by the hypervisor 16 are available for detection. Rather than use all 1,656 available sensors for detection, feature extraction using a randomly selected subset of 20% of the malware samples was first performed to determine which features are most informative for malware detection.

The motivation for performing feature extraction is twofold. First, by reducing the total number of features used for detection, both the computational requirements of the local detectors 40 and the computational overhead introduced by the sensors 20 are reduced. Second, experimentation revealed that only a subset of the features exhibited detectable changes in distribution that were correlated with the introduction of malware to a host. Other features exhibited changes in distribution that were uncorrelated with the introduction of malware, likely due to the changes in the background load running on the testbed. The inclusion of such features in the local detector 40 would result in spurious detections leading to decrease in the overall accuracy of the MDS 10. Such features are deemed not informative for malware detection and are removed from consideration during the feature extraction step.

The feature extraction process proceeds in three stages. First, a two-sample Kolmogorov-Smirnov test was performed on the feature data to determine for each extracted feature and each malware sample whether the feature exhibits a change in distribution after the system is infected. Here, all features that do not exhibit a change in distribution for at least one of the malware samples were removed from consideration.

For the second stage, those features whose data are not informative for malware detection using Page's CUSUM test even though they exhibit a change in distribution were eliminated. As a simple example, one of the sensors 20 reports the uptime of the VM 14, which is always higher after the malware executes and thus identified as one of the sensors 20 whose distribution is different after infection. All of the features that exhibited such behavior, including features that exhibited monotone or near-monotone increasing behavior were removed from consideration.

In the final stage, the local detectors were used to perform Page's CUSUM as described herein on the remaining features. The test was performed as previously described: first training the detector 20 when the guest OS 12 is first started and then performing detection on the remaining data. Sensors 20 exhibiting a high false alarm rate, i.e., sensors 20 that frequently indicate the host is infected when it is clean, are removed from consideration.

After feature reduction, 339 features remain that are used for detection. The remaining features include mainly processor and network performance indicators. On the processor side, the remaining features include:
Processor hypercalls/sec,
Interrupt hypercalls/sec,
Large page translation lookaside buffer (TLB) fills/sec,
Percent privileged time,
MSR accesses cost, and
CPUID instructions cost.
And on the networking side, the remaining features include:
Outbound connections/sec,
Miniport Send Cycles/sec,
Stack Receive Indication Cycles/sec, and
NDIS Receive Indication Cycles/sec.
Detection Performance The detection performance of the MDS 10 in terms of overall detection accuracy and detection delay was examined. The detection results were obtained using 375 iterations of the test sequence described in FIG. 5. Since there are only 200 malware samples used for testing, this means that multiple malware samples are used twice, each time with a different start time and different ordering of the background load generated by the Drupal test suite.

The testing results were obtained using the following parameters: The parameter estimates are determined during a 7 minute training period separated into 20 second blocks. The standard deviation multiplier for the change magnitude was configured to be n=3, setting $\delta_\mu = 3\sigma_{\mu ML}$ for the mean and $\delta 2 = 3\sigma_{2ML}$ for the variance.

The number of standard deviations above the mean to set the detection thresholds $h^{(a)}$ was determined experimentally by determining the smallest number of standard deviations that would result in no false alarms in data sets used for feature reduction. The number of standard deviations was uniquely determined for each sensor 20. A 5-minute reset delay was used at the DFC 50 after which any local detector 40 indicating a positive detection is reset if no global detection has been made.

The overall accuracy of the MDS 10 in terms of its receiver operating characteristic (ROC) was calculated, which is a plot of the true positive rate vs. the false positive rate of the system. The curve was generated by varying the threshold k of the DFC 50. Here, the true positive rate was defined as the fraction of the data sets that the MDS 10 correctly identifies as infected after the malware executes. Conversely, the false positive rate is defined as the fraction of the data sets that the MDS 10 incorrectly identifies as infected when the host is in a clean state.

Figure 7:
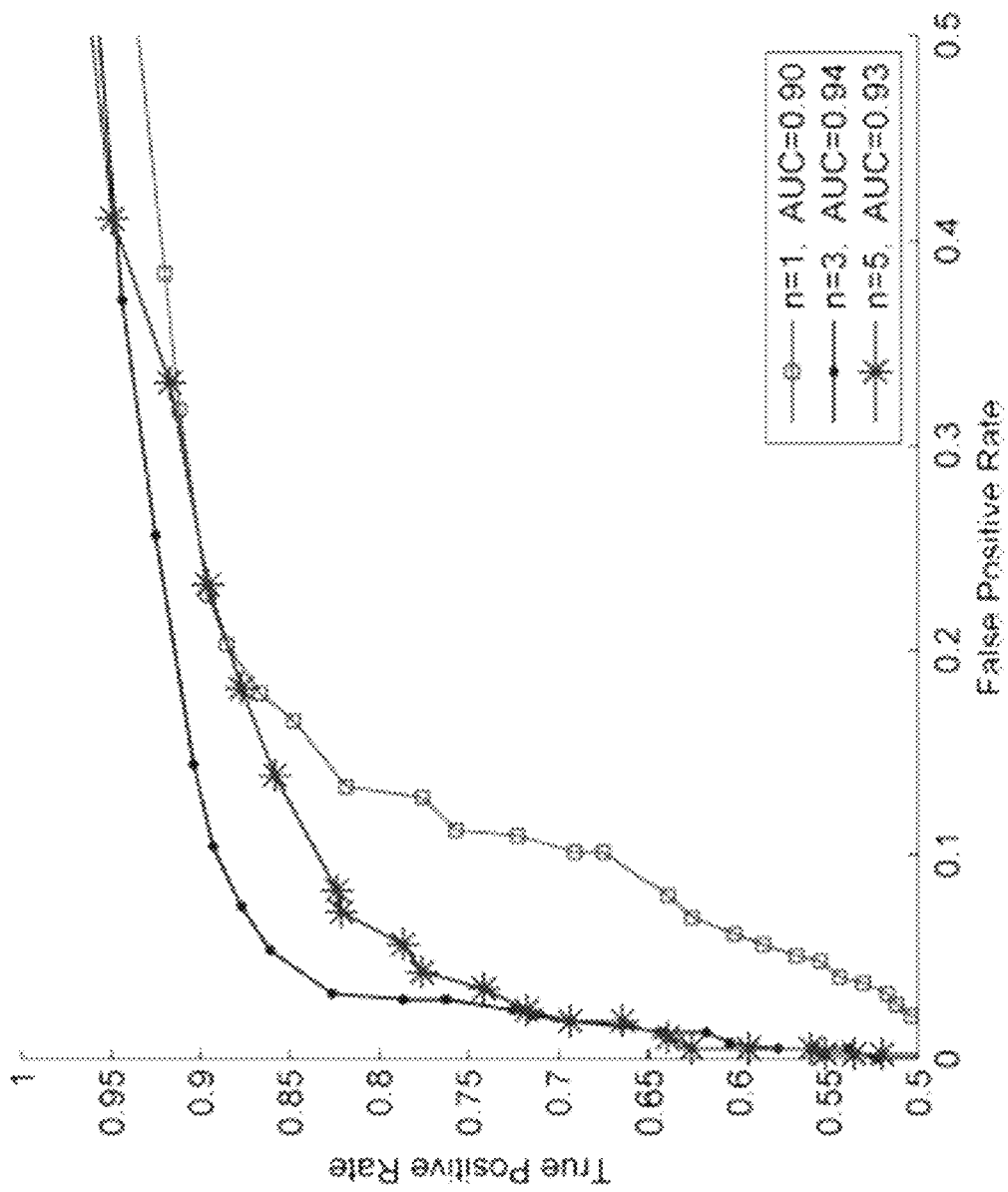
FIG. 7 illustrates the receiver operating characteristic (ROC) for three different change magnitudes: n=1, n=3 and n=5 where the total area under the curve (AUC) of the ROC is a measurement of the overall accuracy of the detector, where a perfect detector has an AUC of 1.

The ROC is presented in FIG. 7 and shows only the detail of the upper-left quadrant of the ROC. For comparison, three ROC curves are shown for different change magnitudes: n=1, n=3 and n=5. The total area under the curve (AUC) of the ROC is a measurement of the overall accuracy of the detector, where a perfect detector has an AUC of 1. The AUC of the MDS 10 when n=3 is the highest, at 0.94. The highest detection rate achievable without experiencing any false alarms was determined: 0:52. This number indicates that the MDS 10 was able to correctly identify that the VM 14 was infected for 52% of the data sets without any occurrence of false alarms, using a DFC threshold of k=21.

The performance of the MDS 10 further was analyzed by examining the detection delay $t_d$. For this analysis, the DFC detection threshold k=21 that gives rise to the 52% detection rate described above and measures the detection delays as the elapsed time between when the malware is executed and when the MDS 10 correctly identifies the host as infected was used. The median detection delay $t_d$ was 96 seconds and 90% of the malware were detected in under 3 minutes.

Figure 8:
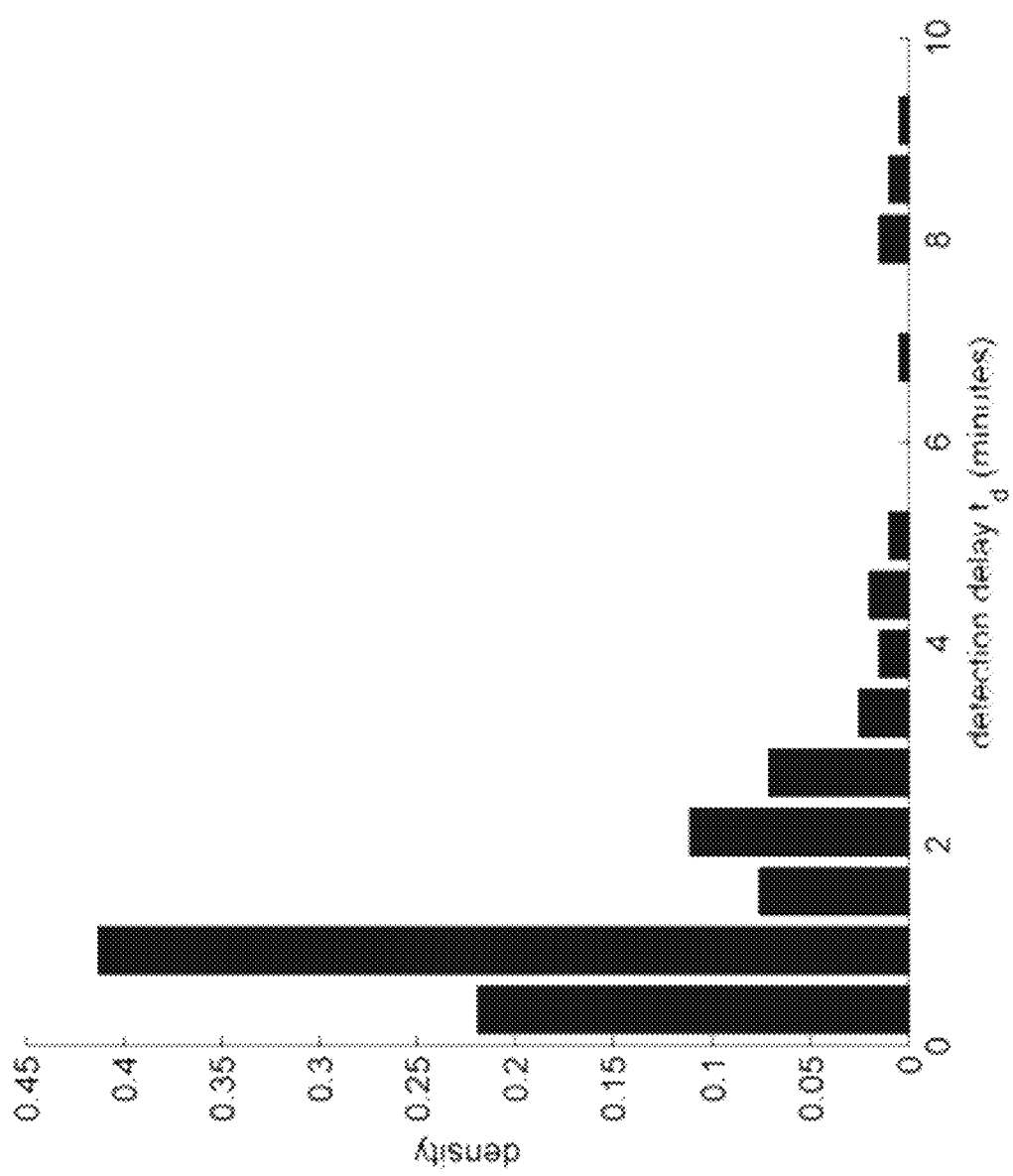
FIG. 8 illustrates a histogram of the detection delays measured in minutes for each of the sample data sets used to test the malware detection performance.

A histogram of the detection delays measured in minutes for each of the data sets is shown in FIG. 8. The histogram indicates that for some data sets the MDS 10 took up to 10 minutes to detect the offending malware. These data sets likely involved malware samples that were less aggressive at their onset. For example, one such malware sample was observed waiting several minutes before spawning new processes and performing malicious tasks, presumably to avoid being noticed by an administrator monitoring the process activity on the system. This finding points to the possibility that there may have been other malware samples that the MDS 10 would have detected if the host 18 continued to run longer than 10 minutes after infection, leading to an increase in the overall detection accuracy of the system.

The case study was designed to determine whether the described MDS architecture coupled with the selected features is effective at detecting the execution of state-of-the-art malware on a modern operating system under heavy and heterogeneous computational load. Three design choices—the decentralized detection architecture, the use of Page's CUSUM test, and the fusion rule used at the DFC—will be discussed.

The decentralized detection architecture was chosen under the assumption that the function and implementation of malware determine the subset of features that are perturbed when the malware executes. In the case study, a 52% detection rate with 0 false alarms was achieved when only 21 parameters from the 339 features exhibited a detectable change. Furthermore, the subsets of features exhibiting a change for each malware sample varied, with all 339 features being perturbed by at least one malware sample. Additionally, the ROC curve shows that increasing the detection threshold leads to a decrease in detection rate, indicating that the number of sensors 20 perturbed by the malware also differs from sample to sample. Page's CUSUM test was chosen because it is among the computationally least complex algorithms for change-point detection that can handle a problem where only the parameters before the change are known. However, it requires that an assumption that a parametric distribution for the feature data and limits to detecting only changes in parameter for the chosen distribution. Statistical goodness of fit tests were used to determine that the majority of the feature data could be accurately approximated by a normal distribution; however, there were features that were not well described by a normal distribution. The application of non-parametric detection techniques at the local detector level could possibly overcome this limitation and provide more accurate detection results. The k out of N fusion rule is used to establish a baseline of the performance that can be achieved using the described system. It is expected that the use of fusion rules that consider the statistics of the local detectors and the sequential nature of the data will lead to improved overall detection performance.

The DFC 50 may also be extended to perform classification to help guide mitigation and post-mortem analysis. For example, since it is known that the subset of perturbed features differs for each malware sample, one may be able to map from the perturbed features to an existing malware taxonomy. The features chosen for this study were chosen because they monitor a wide variety of features of the underlying operating system, and the detection results indicate that a subset of 339 of them provided adequate information to infer the execution of malware on a live computer host. It is expected that in order to make the system more accurate and applicable to a wider variety of computer hosts, the feature set may be expanded to other layers, including sensors 20 monitoring individual applications and services, network usage, and the host OS 18 running the hypervisor 16. Additionally, it may prove useful to extract features from system call, file system, registry, or network traces, as such traces have been shown to be informative data sources for malware detection.

Also discussed are the choices for the amount of training time, the block size used during training, the detection thresholds $h^{(a)}$, and the standard deviation multiplier n used to determine the change magnitudes. These values were arrived at experimentally, by considering a variety of choices for each parameter and comparing the AUC of the associated detection results. Changing each parameter from the stated values generally resulted in a marginal decrease in overall detection accuracy, with the exception of the training time. For example, FIG. 7 shows that changing the standard deviation multiplier from n=3 results in an overall decrease in detection accuracy. Increasing the training time leads to an increased detection accuracy, although the percent improvement quickly declines as the training time increases. For example, increasing the amount of training from 7 to 8 minutes led to an increase in the AUC of less than 1%.

To summarize, the embodiment of MDS 10 in FIG. 2 provides a novel application of Page's CUSUM test to the malware detection problem, using the test as part of a decentralized MDS that uses a data fusion center (DFC) 50 to process decisions made by the local detectors 40 to determine whether a host is infected with malware. The malware detection problem is posed as a quickest detection problem and describes a novel application of sequential detection techniques and data fusion rules to infer the presence of malware. The results of the case study designed to test the effectiveness of the described MDS in detecting malware on a virtual machine host experiencing heavy and diverse computational load demonstrated that the MDS 10 was capable of quickly detecting a majority of the malware with no false alarms on the described testbed. Additional embodiments are described, including an exploration of alternate fusion rules, expansion of the system to perform classification, and the inclusion of additional features to use for malware detection. Furthermore, additional testing of the MDS 10 under different load conditions and on different hosts may be useful for determining the applicability of the described approach to other systems.

A more detailed embodiment of the MDS 10 of FIG. 2 will now be discussed with respect to FIGS. 10-14.

Feature Extraction

As will be appreciated by those skilled in the art, one of the major challenges of behavioral malware detection is feature extraction. This is the process of selecting a feature space in which one can adequately discriminate between clean and infected hosts. The objective is to select a feature space that exhibits a change in distribution when malware execute, while minimizing changes caused by benign changes in the workload of a host. The feature extraction process described herein for the exemplary embodiment of the invention removes redundancy in the input data and transforms the data into a representation that facilitates the application of change-point algorithms for malware detection.

Two types of sensors 20 are considered that measure behavioral characteristics of a host: Performance monitors that report resource usage statistics and system call sensors that report the number of calls made to each operating system (OS) function per second. These two sets of sensors 20 were chosen to collect both OS interaction and system-wide resource usage patterns previously demonstrated to carry information about the execution of malware.

The feature extraction process is performed off-line, using data collected from hosts intentionally infected with malware. Two sets of training data are collected to use for feature extraction, clean data from hosts running their normal workload and infected data from the same hosts infected with malware. The datasets are grouped based on the classes of the malware used for their creation, where a malware class is defined as a collection of malware that share a common function or heritage. For each class, two features are selected, one system call feature and one performance monitor feature.

The first stage of the feature extraction process is feature scaling in which normalization is used for the performance monitor data and a term frequency—inverse document frequency (TF-IDF) transformer for the system call data. The next stage is a feature reduction stage, wherein principal component analysis (PCA) is used to remove redundancy in the input data. The final stage is a second feature reduction stage, wherein linear discriminant analysis (LDA) is used to project the data onto a low-dimensional space that optimally separates the clean and infected datasets.

In the on-line environment, the process of computing the feature data from the raw sensor data is referred to as feature extraction. Given a row vector $x_{pm}=[x_1, x_2, \ldots, x_{m1}]$ of one measurement collected from each performance monitor during one sampling period, and a row vector $x_{sc}=[x_1, x_2, \ldots, x_{m2}]$ of the system call sensor data collected at the same sampling period, one computes the feature vector $y=y_1, y_2, \ldots, y_n]$.

A. Feature Scaling

The performance monitors report system-wide CPU, disk, network, and memory usages statistics, and application-specific statistics. To ensure that the relative scales of the statistics do not bias the detection system, normalization is used to scale the data from each sensor to be zero mean, unit variance. If the collection of all of the data collected from the $i^{th}$ sensor during training is considered and the sample mean pi and the sample variance $\mu_i$ of the data are computed, the normalized sensor values $\hat{x}_i$ may be computed to be:

$$\hat{x}_i = \frac{x_i - u_i}{\sigma_i} \qquad (6)$$

During the off-line feature extraction process, the parameters $\mu_i$ and $\sigma_i$ are computed for each sensor 20 and the following two vectors are constructed to use for feature scaling on the performance monitor data:

$$v_\mu = [\mu_1, \mu_2, \ldots \mu_m] \qquad (7)$$
$$v_{fs} = \left[\frac{1}{\sigma_1}, \frac{1}{\sigma_2}, \ldots \frac{1}{\sigma_m}\right]$$

The system call sensors report the number of calls made to each system function per second. The system functions provide file system, memory, and hardware access, and provide an interface to core graphical components. While an average of nearly 10,000 system calls per second were observed in the case study, on average only 96 of the 783 monitored functions were called during a given second. As a result, the majority of system call sensor readings are zero. Furthermore, the number of calls made to each of the system functions varies significantly, with some functions averaging more than 1,000 calls per second, while others average less than 1 call per second.

The feature scaling technique used on the system call sensor data is term frequency-inverse document frequency (TF-IDF) transformation, commonly used in text processing and demonstrated to be useful in intrusion detection. The TF-IDF transformer scales the sensor data and deemphasizes the most commonly called system functions. It computes the products of two components, the term frequency tf and the inverse document frequency idf. The term frequency scales proportionally to the number of calls to a system function per second. Given a vector x of the calls to each of the 783 system functions for a given sampling period, the term frequency of a raw system call sensor reading $x_i$ is calculated using the following expression, where $x=x_{sc}$:

$$tf_x(x_i) = \frac{x_i}{\|x\|_2} \qquad (8)$$

The inverse document frequency scales inversely with the number of calls made to a particular function over an extended period of time. Let $S_i$ be the total number of samples in the training set taken from the $i^{th}$ sensor, and let $s_i$ be the number of nonzero samples in the training set. The inverse document frequency is given by:

$$idf_{s_i}, s_i(x_i) = \log\left(\frac{S_i}{1 + s_i}\right) \qquad (9)$$

The inverse document frequency for each of the system functions is computed by computing $S_i$ and $s_i$ from all of the training sets during feature extraction. Using TF-IDF for feature extraction requires the extra step that is computed $\|x\|_2$ for each sample vector x on-line. The overall TF-IDF feature extraction process is described by the expression:

$$tf\text{-}idf_{x,s_i}, s_i(x_i) = tf_x(x_i) idf_{s_i}, s_i(x_i) \qquad (10)$$

To perform feature extraction on the system call data in an on-line environment, the following two vectors are constructed to use for feature scaling:

$$v_\mu = 0 \qquad (11)$$
$$v_{fs} = \left[\frac{1}{\|x\|_2}\log\left(\frac{s_1}{1+s_1}\right), \ldots, \frac{1}{\|x\|_2}\log\left(\frac{s_m}{1+s_m}\right)\right]$$

B. Principal Component Analysis

The second step of the feature extraction process is to perform principal component analysis (PCA) on the scaled data. PCA is performed separately on the normalized performance monitor data and on the TF-IDF features extracted from the system call data. PCA is used to project the data onto a lower dimensional subspace composed of orthogonal components chosen to maximize the variance of the projected data. PCA is used because the final step of the feature extraction process, LDA, performs best when the input features are uncorrelated. To remove redundancy while retaining enough information to perform detection, the subset of principal components are selected that explain 99.99% of the variance in the data. The selected set of principal components are used as inputs to the LDA feature extractor. During feature extraction, an $m \times m_{pca}$ matrix of weights $M_{pca}$ is selected to use during feature extraction, where m is the number of sensors, $m_{pca}$ is the number of principal components output by the PCA transformation, and $m_{pca} \leq m$.

C. Linear Discriminant Analysis

The final step of the feature extraction process, linear discriminant analysis (LDA), projects the PCA transformed data to a low-dimensional space. LDA uses the labels of the training data—i.e., whether the data came from a clean or infected system—to determine the weights to use for the projection. The weights are chosen to maximize the separation between the two groups of projected data while minimizing the variance within each group. During feature extraction, an $m_{pca} \times 1$ vector of weights is learned each time the LDA algorithm is run. For each class of malware considered during training, the labeled training data is used to perform LDA. An $m_{pca} \times n/2$ matrix $M_{lda}$ is constructed by concatenating the vectors learned during LDA for each malware class. LDA is performed separately for the performance monitor and system call sensor data to extract a total of n features from the raw sensor data.

Figure 9:
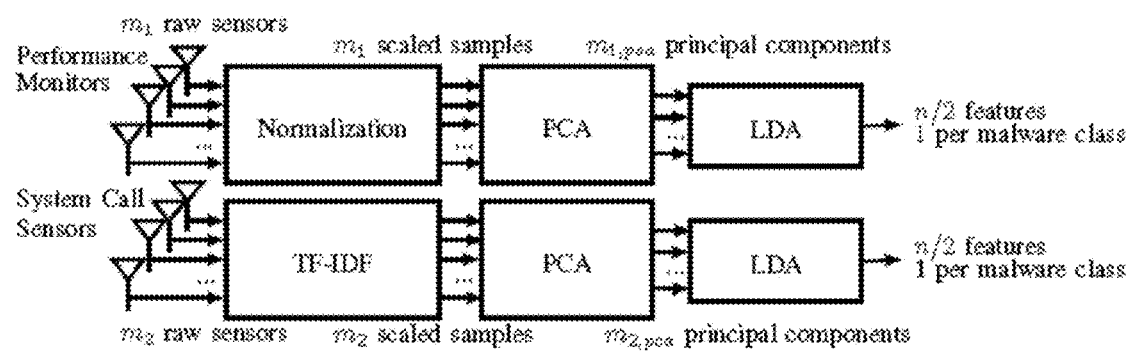
FIG. 9 illustrates a summary of the feature extraction process, indicating each stage of the process and the length of the data vectors passed between the stages in the system of FIG. 2.

FIG. 9 shows a summary of the feature extraction process, indicating each stage of the process and the length of the data vectors passed between the stages. The process starts with $m_1 + m_2$ raw data samples, $M_{1,pca} + M_{2,pca}$ principal components are extracted using PCA, and n total features are extracted using LDA. The feature extraction process can be described using the following equation, where $v_n$ are the normalization means, $v_{fs}$ are the feature scaling weights, $M_{pca}$ is is the matrix used for performing PCA, and $M_{lda}$ is the matrix used for performing LDA:

$$y_{pm|sc} = ((x_{pm|sc} - v_n) \odot v_{fs}) M_{pca} M_{lda} \qquad (12)$$

The performance monitor and system call features are extracted separately, using distinct values for $v_n$, $v_{fs}$, $M_{pca}$, and $M_{lda}$. The complete feature vector y is constructed by concatenating the n/2 performance monitor features $y_{pm}$ and the n/2 system call features $y_{sc}$.

Detection and Data Fusion

As noted above with respect to FIG. 2, the malware detection system 10 contains multiple local detectors 40 that use change-point detection algorithms to infer whether a change has occurred for a particular feature, and a data fusion center (DFC) 50 that uses the local detector decisions to make a single diagnosis as to whether the system is clean or infected at each sampling period.

A. Local Detectors

To describe the operation of the local detectors, consider a single feature output by the feature extractor. The data at the $j^{th}$ feature is considered to be a time series of measurements:

$$Y^j = \{y_1^j, y_2^j, y_3^j, \ldots\}, \quad (13)$$

where the superscript indicates which feature the sensor data came from. Next, the infection time t is defined as the time the host begins executing malware. The distribution of $t_1$ is not known a priori, nor is $t_1$ guaranteed to be finite (a host may never be infected with malware). Given $t_1$, one can separate the feature data into two separate time series:

$$Y_{clean}^j = \{y_1^j, y_2^j, \ldots, y_{t_1-2}^j, y_{t_1-1}^j\} \quad (14)$$

containing the data collected before the malware execute, and $$Y_{infected}^j = \{y_{t_1}^j, y_{t_1+1}^j, y_{t_1+2}^j, \ldots\} \quad (15)$$

containing the data collected after the malware execution begins. The data $Y_{clean}^j$ can be approximately described as realizations of a independent, identically distributed (i.i.d.) random variable (RV) with a normal probability distribution function (PDF):

$$P_{\mu_0^j, \sigma^j}(x), \quad (16)$$

and the data $Y_{infected}^j$ as realizations of an i.i.d. RV with a PDF:

$$P_{\mu_1^j, \sigma^j}(x) \quad (17)$$

where $\mu_0^j \neq \mu_1^j$ and the variance $\sigma^j$ does not change.

It is assumed that one can learn the parameters $\mu_0^j$ and $\sigma^j$ from training data either collected off-line using a test load or on-line while the system is assumed to be in a clean state. For testing, these parameters are learned automatically on-line, during the initial execution of the hosts on which detection is performed. It is assumed that the change in mean occurring at the infection point has a magnitude of at least $3\sigma^j$:

$$|\mu_0^j - \mu_1^j| \geq 3\sigma^j \quad (18)$$

As noted above, to detect the change in the mean about the infection point, one may use a two-sided implementation of Page's cumulative sum (CUSUM) test. An implementation of the CUSUM test is used that treats the change-point detection problem as a repeated, cumulative log-likelihood ratio (LLR) test with an adaptive threshold. Each local detector simultaneously computes two LLRs, one for detecting an increase and a decrease in the mean, respectively. As noted with respect to equation (3) above, the LLRs are computed recursively as:

$$g_i^{j,inc} = g_{i-1}^{j,inc} + \log\left(\frac{P_{\mu_0^j + 3\sigma^j, \sigma^j}(y_i^j)}{P_{\mu_0^j, \sigma^j}(y_i^j)}\right) \quad (19)$$

$$g_i^{j,dec} = g_{i-1}^{j,dec} + \log\left(\frac{P_{\mu_0^j + 3\sigma^j, \sigma^j}(y_i^j)}{P_{\mu_0^j, \sigma^j}(y_i^j)}\right)$$

Each LLR will tend to decrease if a change in the mean has not occurred and increase when a change in the mean occurs. Accordingly, each LLR is reset to zero whenever it becomes negative:

$$g_i = \begin{cases} g_i & \text{if } g_i > 0 \\ 0 & \text{otherwise} \end{cases} \quad (20)$$

and compare the adapted LLRs to a fixed threshold h. Each local detector 40 makes a binary decision whether the system is clean (−1) or infected (+1) at each iteration:

$$d_i^j = \begin{cases} +1 & \text{if } g_i^{j,inc} > h \text{ or } g_i^{j,dec} > h \\ -1 & \text{otherwise} \end{cases} \quad (21)$$

Thus, for each sampling period i, a reading is sampled from each of the m sensors, the feature extractor 30 computes n features from the sensor data, and the n local detectors 40 each report a decision. The result is a vector of n local decisions output for each sampling period:

$$d_i = [d_i^1, d_i^2, \ldots, d_i^n]. \quad (22)$$

B. Data Fusion Center

The malware detection system 10 is designed to use a data fusion center (DFC) 50 to make a single diagnoses whether a system is clean or infected based on the local decisions $d_i$. As noted above, a commonly used data fusion rule is the so-called k out of n fusion rule, wherein a positive global detection is made only if at least k of the n local detectors composing the system indicate a positive detection. Such a fusion rule weights the importance of the local decisions equally and makes no assumptions about the probability of occurrence of malware infection. The k out of n fusion rule is given by the equation:

$$f(d_i) = \begin{cases} +1 & \text{if } \Sigma_{j=1}^n d_i^j \geq 2k - n \\ -1 & \text{otherwise} \end{cases} \quad (23)$$

Experimental Evaluation

Another series of experiments were performed to evaluate the effectiveness of the malware detection system of the invention using data collected from live host servers. Over the course of each experiment:

A host is started in a clean state and begins performing its normal workload;

A malware sample begins executing at a randomly chosen time $t_i$ after the host starts, where $t_2$ is between 5 and 15 minutes; and The host continues to run in an infected state for at least 5 minutes.

The experiments were performed on five different Microsoft Hyper-V virtual machine (VM) hosts running Microsoft Windows Server 2012. Each host was configured as a database and web server, serving a website using the Drupal content management system. During each experiment, a client connects to the web server and issues commands to perform all of the tests in the Drupal test suite. The order in which the tests are performed is randomized to provide diversity in the load profile for each of the experiments. With 55 different categories of tests covering functions such as content access, image processing, searching, and database operations, the workload of the hosts varies in both purpose and intensity over time.

A. Malware

The experimental evaluation used 2,317 distinct malware samples. Each malware sample was used exactly once to infect one of the VM hosts, resulting in 2,317 datasets. The malware samples used for the evaluation were first seen as early as 2006 and as recently as October 2013.

Although there is no universal malware taxonomy, similar malware was grouped using the labels provided by various AV vendors, which were obtain using the free online scanning service VirusTotal. Using the labels provided by Microsoft, the malware was grouped by category, where a category loosely defines a set of malicious functions. For example, backdoors are malware that provide clandestine remote access, Trojans masquerade as legitimate applications, and password stealers send private information such as passwords to third parties. Table I shows the number of samples in the nine most common Microsoft categories. The categories listed in Table I describe nearly 95% of the malware in the corpus used for the experimental evaluation.

Malware samples often exhibit characteristics of multiple categories, making it difficult to place a malware sample in a single category. Therefore, it is also useful to consider the different families of the malware samples, where the family labels describe either a specific set of malicious functions or a particular malware heritage. Whereas the malware used in the studies spanned a total of 24 categories, the same samples span 671 distinct families, indicating that the malware collection contains many samples that are variants within the same family. The seventeen most common families account for 35% of the total malware, and the representation in the seventeen top families varies from 20 to 91 samples. During feature extraction, a different feature was learned for each of the most common malware families and categories. 52 different features were learned, two features for each for the 9 most common categories listed in Table I and each of the 17 most common families (listed below in Table II).

TABLE I

TOP MALWARE CATEGORIES BY NUMBER OF SAMPLES

| Label | Samples |
| --- | --- |
| TrojanDownloader | 461 |
| Backdoor | 421 |
| Trojan | 382 |
| PasswordStealers | 271 |
| Worm | 232 |
| TrojanSpy | 220 |
| TrojanDropper | 87 |
| Virtool | 79 |
| Virus | 45 |

Results and Analyses

The malware detection system 10 described herein was used to detect the execution of the 2,317 malware samples described above, quantifying the performance of the detection system in terms of its overall accuracy and the amount of time it takes to detect malware after they begin execution. The results presented herein were obtained using 4-fold cross-validation, wherein the datasets were partitioned into four subsets for testing. At each cross-validation fold, three of the subsets were selected to use for feature extraction, and detection was performed on the remaining subset. For feature extraction, the process described above was used to select 52 features, two each for the 17 most common malware categories (Table I) and 9 most common families (Table II).

During detection, the feature data is extracted from the sensor data sequentially, using the feature extraction equation (12) together with the parameters computed during feature extraction. During the first 60 seconds of execution, the host is assumed to be clean. The feature data collected during that period is used to characterize normal operation, computing the parameters $\mu_0^j$ and $\sigma^j$ to use in the local detectors 40. After 60 seconds, detection begins, performing the CUSUM test on each of the features and fusing the results from each of the detectors 40 at the DFC 50.

The accuracy of the detection system is evaluated in terms of its receiver operating characteristic (ROC) curve, a plot of the true positive (TP) rate vs. the false alarm (FA) rate. A FA occurs when the malware detection system incorrectly reports a clean host to be infected. The FA rate is the fraction of clean hosts that were incorrectly identified to be infected. A TP occurs when the malware detection system correctly detects an infected host. The TP rate is the fraction of the infected hosts that were correctly identify as infected.

The ROC curve shows the trade-off between the FA rate and TP rate, indicating the maximum TP rate that can be achieved at a given FA rate. The area under curve (AUC) of the ROC characterizes the overall accuracy of the detector, where the AUC of a perfect detector is 1. Each point on the local detector ROC curves corresponds to a specific detection threshold h for the CUSUM algorithm (21), while each point on the ROC for the overall detection system with fusion corresponds to a DFC threshold k.

A. Category Features

Figure 10:
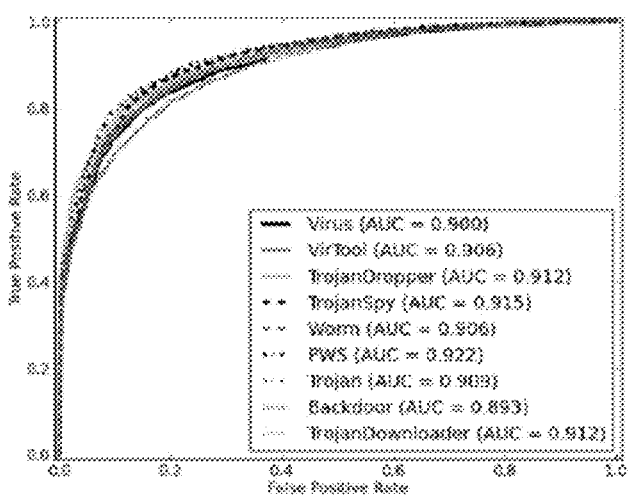
FIG. 10 illustrates the detection accuracy of the malware detection system with features selected using the nine most common categories of malware obtained at each of the local detectors, using only the system call features and malware category features.

The process begins by examining the detection accuracy of the malware detection system with features selected using the nine most common categories of malware (Table I). FIG. 10 shows the nine ROC curves obtained at each of the local detectors, using only the system call features. Each curve shows the detection performance achieved using a single feature, where the labels indicate the malware category used during feature extraction to select the feature. The ROC curves indicate that each of the features affords approximately the same detection accuracy. Similarly, FIG. 11 shows the nine ROC curves obtained at each of the local detectors using the performance monitor features, with the overall detection accuracy of the virus and virtool features being a bit inferior to the others.

In general, the AUG is higher for the performance monitor features than the system call features. The inventors do not believe this increased detection accuracy is due to the performance monitor data carrying more information about the malware detection task. Rather, it is likely due to the performance monitor features being better described by the models used at the local detectors: The raw performance monitor data are approximately normally distributed, while the raw system call data are more closely approximated by an exponential distribution.

Figure 11:
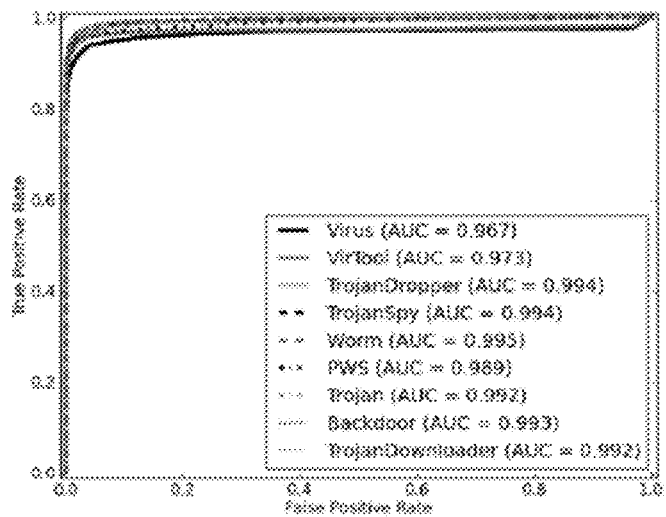
FIG. 11 illustrates the nine ROC curves obtained at each of the local detectors using the performance monitor features and malware category-based features, with the overall detection accuracy of the virus and virtool features being a bit inferior to the others.
Figure 12:
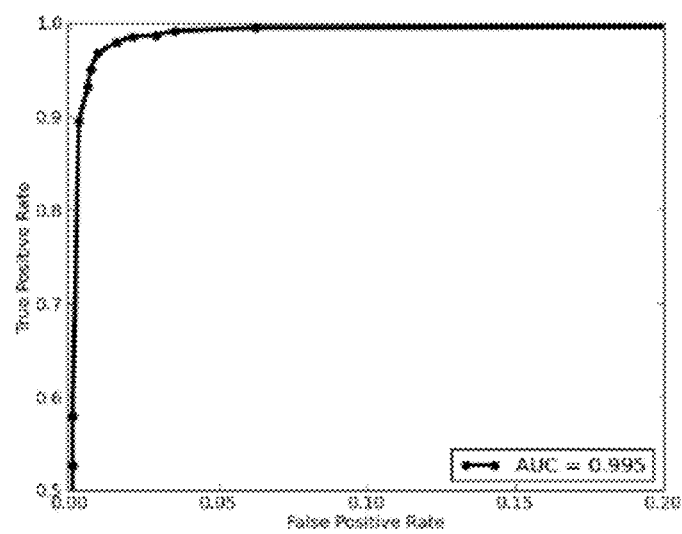
FIG. 12 illustrates the ROC curve achieved at the DFC using all of the decisions from the local detectors, whose ROC curves are shown in FIGS. 10 and 11.

FIG. 12 presents the ROC curve achieved at the DFC 50 using all of the decisions from the local detectors 40, whose ROC curves are shown in FIGS. 10 and 11. The curve is created by fixing the local detector thresholds and varying the threshold k at the DFC 50. FIG. 12 shows a detailed view of the upper left segment of the ROC curve, indicating a point at each discrete DFC threshold k. The line connecting the points indicates the detection performance that can be achieved using a mixed detector that decides between two thresholds k and k+1 probabilistically. The data points achieving higher TP and FA rates correspond to lower thresholds k. While the total AUC of the DFC 50 in FIG. 12 indicates only a small gain in performance over the local detector AUCs in FIGS. 10 and 11, the DFC 50 both achieves a higher TP rate at low FA rates and provides robustness, since the highest performing local detectors are dependent on the training sets and not known a priori.

TABLE II

AUC FOR FAMILY-BASED FEATURES

| malware family | sys. call | perf. Monitor |
|---|---|---|
| Backdoor: Fynloski | 0.864 | 0.982 |
| Backdoor: Hupigon | 0.893 | 0.967 |
| Backdoor: IRCbot | 0.855 | 0.971 |
| Backdoor: PcClient | 0.870 | 0.958 |
| PWS: Frethog | 0.891 | 0.948 |
| PWS: OnLineGames | 0.838 | 0.967 |
| PWS: Zbot | 0.855 | 0.976 |
| Trojan: Malex | 0.880 | 0.952 |
| TrojanDownloader Banload | 0.904 | 0.972 |
| TrojanDownloader Renos | 0.885 | 0.941 |
| rojanDownloader: Small | 0.897 | 0.989 |
| TrojanDownloader: Zlob | 0.883 | 0.992 |
| TrojanSpy: Bancos | 0.892 | 0.991 |
| TrojanSpy: Banker | 0.904 | 0.965 |
| TrojanSpy: Treemz | 0.815 | 0.977 |
| VirTool: Obfuscator | 0.893 | 0.987 |
| Worm: Mydoom | 0.879 | 0.995 |

B. Family Features

Next, the detection accuracy of the system is considered with features selected using the 17 most common malware families. In Table II, the detection accuracy achieved using each of the features is presented, identified by the malware family used to select the feature. Table II shows the AUC for each of the 34 local detectors. The detectors using the family features underperformed the detectors using the category features (FIGS. 10 and 11) in terms of the AUC by an average of 3%. This decrease in accuracy indicates that the family features did not individually generalize to detecting a wider array of malware as well as the category features. The variance of the AUC for the family features is also higher than the category features, indicating more diversity in the family features. The AUC of the detection system using the family features with fusion is 0.997, slightly higher than the 0.995 achieved with the category features. This increase in overall accuracy is due to the increased robustness afforded by the diversity in the family features.

C. FA Rate Considerations

In order to be effective in production environments, malware and intrusion detection systems must exhibit a low FA rate while providing adequate detection. Accordingly, it is desirable to determine the maximum TP rate one can achieve for given FA rate. These values, which can be extracted from the ROC curves, are listed for FA rates of interest in Table III. Table III indicates that at a FA rate of 0.01, the performance of the detection system using the category and family features are nearly identical. However, as one considers lower FA rates, the system using the family features greatly outperforms the system using the category features. Of particular interest is the maximum TP rate achieved while raising no FAs during the experimental evaluation. At a FA rate of 0, the malware family labels provide a maximum TP rate of 0.697, indicating that the system was able to correctly identify nearly 70% of the malware samples using the 34 malware family features without raising any false alarms.

TABLE III

MAXIMUM TP RATES ACHIEVED AT FIXED FA RATES AT THE DFC

| | false alarm rate | | |
|---|---|---|---|
| | 0.0 | 0.001 | 0.01 |
| malware category features | 0.284 | 0.579 | 0.968 |
| malware family features | 0.697 | 0.824 | 0.985 |

D. Detection Time

Figure 13:
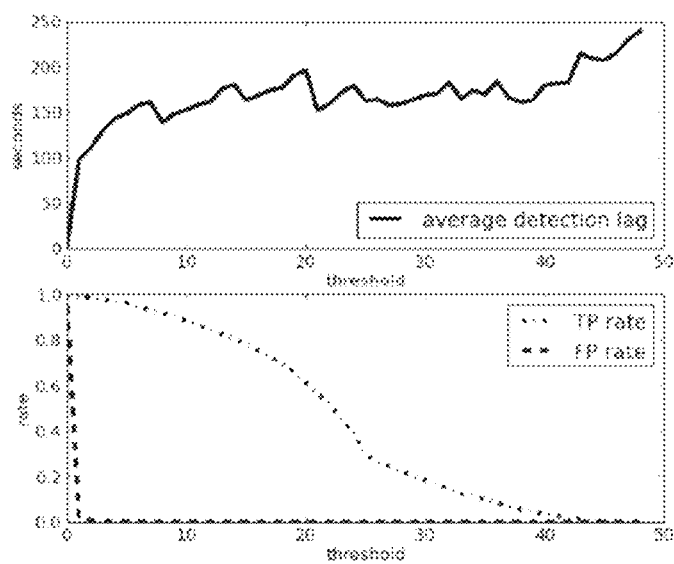
FIG. 13 illustrates the effect that varying the threshold k at the DFC has on the average detection lag, TP rate, and FA rate.

The amount of time it takes to detect that malware are executing on a host is an important consideration, since malware execution can result in data loss, data theft, and further malware propagation. The time elapsed between the infection time and the detection time is the detection lag, and the average detection lag observed using the malware family features with fusion is plotted in FIG. 13. FIG. 13 shows the effect that varying the threshold k at the DFC 50 has on the average detection lag, TP rate, and FA rate. As the threshold is increased, the average detection time increases while the FA and TP rates decrease. Values of interest include the minimum average detection lag achieved at low FA rates. At FA rates 0.01, 0.001, and 0 the average detection lags are 111, 175 and 176 seconds, respectively.

There are two major factors that affect the overall performance of the detection system. These are the local detector thresholds h and the DFC threshold k. For the fusion results presented herein, the local detection thresholds are fixed equally at each detector. It will be appreciated by those skilled in the art that the local detection thresholds can be used to fine-tune the performance of the detection system both in terms of detection lag and detection accuracy.

E. Detection Results vs. Time

While the cross-validated results are presented to provide an indication of how well the detector performs against all of the malware in the data corpus, it is also desirable to examine the accuracy of the detector under a more realistic scenario where features are selected based only malware up to a specific date. To examine this scenario, the dataset is split in half, using all of the malware first seen before 20 Apr. 2009 to perform feature extraction, and attempting to detect all those malware samples first seen after the cutoff date. Because certain families of malware were not present in the malware collection prior to the cutoff data, the number of family features extracted for this round of testing is lower than the number used in cross validation.

Figure 14:
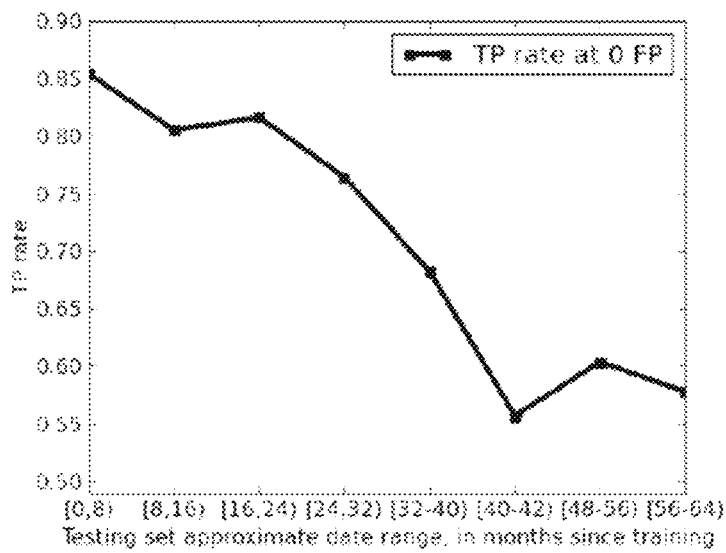
FIG. 14 illustrates the TP rate achieved at a FA rate of zero versus time elapsed since training.

The inventors are particularly interested in how the detection accuracy varies as a function of the time elapsed since the features were extracted. As such, the malware first seen after the cutoff date was divided into eight evenly sized sets, each set containing malware first seen in an approximately 8 month-long period. FIG. 14 shows the maximum TP rate achieved at a FA rate of zero. The testing sets are presented in chronological order, indicated by the time period over which the malware were first seen, given in months since the cutoff date. The TP rate at zero false alarms exceeds the overall cross validation result, exceeding 0:85 for the initial 8 month period, and remaining above 0:8 for the first three sets (24 months). The decrease in the TP rate over time indicates a need to periodically refine or augment the features used for detection. In a real-world scenario, one would expect the feature extraction process to be performed periodically as new malware samples are discovered and analyzed off-line in a controlled laboratory environment. As new malware families are discovered, new features will be added to the detectors. As new samples of existing families are discovered, existing features can also be refined and updated at the detectors. The process of updating the models to use in the detector involves updating the values vn, vfs, Mpca, and Mlda in the feature extraction equation (12). The process of informing detectors in production environments to use a new set of features for detection is analogous to the AV signature distribution paradigm.

Those skilled in the art will appreciate that while the load was varied during the reported experiments to provide diversity, evaluation using wider array of host configurations will determine how portable the feature sets are to different host configurations. More long-term experiments will serve to better characterize the number of FAs per unit time and will provide the opportunity to study whether the models of normal behavior need to be refined over time. Finally, experiments including both gradual and abrupt changes in workload and configuration will be used to characterize the effect such changes have on the detection system. These three topics are all extensions to the experimental evaluation described herein this paper, and are intended to establish whether the described techniques can be applied more generally to different types of hosts and environments.

In summary, the inventors have presented a malware detection system that monitors the behavior of hosts on-line and uses changes in host behavior to infer the execution of malware. The goal of this system is the detection of new malware samples that are obfuscated variants of, or behaviorally similar to, known malware samples. The system uses an off-line feature extraction process wherein known malware are used to learn features that provide discrimination between clean and infected hosts. The detection system automatically characterizes normal behavior on-line and uses a multichannel change-point detection architecture with a data fusion center (DFC) to detect whether malware have executed on a host. Experimental results using the described detection system to detect 2,317 distinct malware samples have been presented and the results achieved were compared to related work in behavioral malware detection. The reported results indicate a comparable detection accuracy to other published results, achieved with an architecture specifically designed to be deployed on-line for rapid, low-overhead malware detection. Further variations to the system include varying the sensor sampling periods, feature extraction strategies, local detector thresholds, fusion rules, and host configurations and load patterns and determining how detection performance is affected.

Malware detection may be effectuated, as described herein, by a device, a processor, or the like. For example, a processor may be coupled to a memory that that comprises executable instructions, that when executed by the processor causes the processor to effectuate operations for effectuating malware detection. The underlying concepts may be applied to any computing device, processor, or system capable of controlling the device. Certain aspects or portions thereof, may take the form of program code (e.g., instructions) embodied in computer-readable storage media having a tangible physical structure. Examples of computer-readable storage media include floppy diskettes, CD-ROMs, DVDs, hard drives, or any other tangible machine-readable storage medium (computer-readable storage medium) having a tangible physical structure. Thus, a computer-readable storage medium is not a transient signal per se. A computer-readable storage medium is not a propagating signal per se. A computer-readable storage medium is an article of manufacture. When the program code is loaded into and executed by a machine, such as a computer or processor, the machine becomes an apparatus for controlling the device.

While malware detection has been described in connection with the various embodiments of the various figures, it is to be understood that other similar embodiments may be used or modifications and additions may be made to the described embodiments of malware compression without deviating therefrom. For example, one skilled in the art will recognize that embodiments and application of malware detection as described in the instant application may apply to any appropriate environment, and may be applied to any number of devices. Therefore, malware detection as described herein should not be limited to any single embodiment, but rather should be construed in breadth and scope in accordance with the appended claims.

What is claimed:

1. A malware detection system comprising:
   sensors that monitor the status of a host computer being monitored for malware, including malware that do not propagate through a network;
   a feature extractor including a processor and a memory that stores instructions that when executed by the processor causes the processor to compute streams of feature data from raw sensor data from the sensors corresponding to predetermined features;
   local detectors that perform malware detection on each stream of feature data from the feature extractor independently; and
   a data fusion center that applies a k out of N fusion rule, where k is a threshold of a number of positive detections and N is a total number of decisions reported by the local detectors, where N=2M and M is the number of local detectors, to the malware detection decisions from the local detectors to infer whether the host computer is infected by malware.

2. The malware detection system of claim 1, wherein each sensor monitors a distinct operating phenomenon of the host computer and reports its raw sensor data once per sampling period.

3. The malware detection system of claim 1, wherein the raw sensor data are processed by the feature extractor to transform the raw sensor data into a set of features to use for detection of malware.

4. The malware detection system of claim 1, wherein the local detectors each sequentially monitors a single stream of feature data from the feature extractor and detects whether a change has occurred in a distribution of the feature data.

5. The malware detection system of claim 4, wherein the local detectors provide a new decision every sampling period regarding whether a change has occurred in the distribution of the feature data.

6. The malware detection system of claim 4, wherein the local detectors each perform an implementation of a change-point detection technique comprising a Page's cumulative sum (CUSUM) test.

7. The malware detection system of claim 6, wherein the CUSUM test is implemented as a repeated cumulative log-likelihood ratio test with an adaptive detection threshold.

8. The malware detection system of claim 6, wherein the feature extractor selects the predetermined features by performing a two-sample Kolmogorov-Smirnov test on the feature data to determine for each feature and each malware sample whether the feature exhibits a change in distribution after the host computer is infected and, prior to using the CUSUM test, eliminates those features whose data are not informative for malware detection using the CUSUM test.

9. The malware detection system of claim 1, wherein the predetermined features include at least one of processor hypercalls/second, interrupt hypercalls/second, large page translation lookaside buffer fills/second, percent privileged time, malicious software removal (MSR) accesses cost, central processing unit identifier (CPUID) instructions cost, outbound connections/second, miniport send cycles/second, stack retrieve indication cycles/second, and network driver interface specification (NDIS) receive indication cycles/second.

10. The malware detection system of claim 1, wherein the feature extractor transforms the predetermined features through feature scaling, in which normalization is used for the feature data and a term frequency—inverse document frequency (TF-IDF) transformer for feature data samples, a feature reduction step in which principal component analysis (PCA) is used to remove redundancy in the feature data samples, and a second feature reduction step in which linear discriminant analysis (LDA) is used to project the feature data samples onto a low-dimensional space that optimally separates the clean and infected datasets.

11. The malware detection system of claim 10, wherein the TF-IDF transformer scales the feature data samples and deemphasizes the most commonly called system functions, computes products of term frequency (TF) and inverse document frequency (IDF), and scales the term frequency proportionally to a number of calls to a system function per second.

12. The malware detection system of claim 1, wherein the data fusion center receives decisions from the local detectors regarding the existence of malware in the feature data each sampling period and combines the decisions from the local detectors into a single malware diagnosis for the host computer.

13. The malware detection system of claim 12, wherein the data fusion center tracks times at which decisions are made by the local detectors.

14. A method for detecting malware that has infected a host computer, comprising the steps of:
sensors monitoring the status of the host computer being monitored for malware, including malware that do not propagate through a network;
a processor computing streams of feature data from sensor data produced in said monitoring step that corresponds to predetermined features;
a local detector detecting malware in each stream of feature data independently; and
the processor applying a k out of N fusion rule, where k is a threshold of a number of positive detections and N is a total number of decisions reported by the local detectors, where N=2M and M is the number of local detectors, to malware detection decisions from the malware detecting step to infer whether the host computer is infected by malware.

15. The method of claim 14, wherein the malware detecting step comprises sequentially monitoring streams of computed feature data and detecting whether a change has occurred in a distribution of the feature data.

16. The method of claim 15, wherein the malware detecting step further comprises implementing a change-point detection technique comprising a Page's cumulative sum (CUSUM) test.

17. The method of claim 16, wherein the CUSUM test is implemented as a repeated cumulative log-likelihood ratio test with an adaptive detection threshold.

18. The method of claim 16, wherein the computing streams of feature data step comprises selecting the predetermined features by performing a two-sample Kolmogorov-Smirnov test on the feature data to determine for each feature sample and each malware sample whether the feature exhibits a change in distribution after the host computer is infected and, prior to using the CUSUM test, eliminating those features whose data are not informative for malware detection using the CUSUM test.

19. The method of claim 14, wherein the predetermined features include at least one of processor hypercalls/second, interrupt hypercalls/second, large page translation lookaside buffer fills/second, percent privileged time, malicious software removal (MSR) accesses cost, central processing unit identifier (CPUID) instructions cost, outbound connections/second, miniport send cycles/second, stack retrieve indication cycles/second, and network driver interface specification (NDIS) receive indication cycles/second.

20. The method of claim 14, wherein the computing streams of feature data step includes transforming the predetermined features through feature scaling, in which normalization is used for the feature data and a term frequency—inverse document frequency (TF-IDF) transformer for the feature data samples, a feature reduction step in which principal component analysis (PCA) is used to remove redundancy in the feature data samples, and a second feature reduction step in which linear discriminant analysis (LDA) is used to project the feature data samples onto a low-dimensional space that optimally separates the clean and infected datasets.

21. The method of claim 20, further comprising scaling the feature data samples and deemphasizing the most commonly called system functions, computing products of term frequency (TF) and inverse document frequency (IDF), and scaling the term frequency proportionally to a number of calls to a system function per second.

22. The method of claim 14, wherein the step of inferring whether the host computer is infected by malware comprises receiving decisions regarding the existence of malware in the feature data each sampling period and combining the decisions into a single malware diagnosis for the host computer.

23. The method of claim 14, wherein the step of inferring whether the host computer is infected by malware comprises tracking times at which decisions are made in the malware detecting step.

* * * * *